US012761831B2

(12) United States Patent
Ji et al.

(10) Patent No.: US 12,761,831 B2
(45) Date of Patent: Oct. 13, 2026

(54) COMPUTATIONAL STORAGE DEVICE, AND COMPUTATIONAL STORAGE SYSTEM AND ELECTRONIC SYSTEM INCLUDING THE SAME

(71) Applicant: SAMSUNG ELECTRONICS CO., LTD., Suwon-si (KR)

(72) Inventors: Soo-Young Ji, Suwon-si (KR); Min-Ho Kim, Suwon-si (KR); Dongouk Moon, Suwon-si (KR); Sang-Hwa Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 18/134,698

(22) Filed: Apr. 14, 2023

(65) Prior Publication Data

US 2024/0004579 A1 Jan. 4, 2024

(30) Foreign Application Priority Data

Jun. 29, 2022 (KR) ........................ 10-2022-0079814

(51) Int. Cl.
*G06F 3/06* (2006.01)
*H04L 67/10* (2022.01)

(52) U.S. Cl.
CPC .......... *G06F 3/0656* (2013.01); *G06F 3/0604* (2013.01); *G06F 3/061* (2013.01); *G06F 3/0659* (2013.01); *G06F 3/0661* (2013.01); *G06F 3/0679* (2013.01)

(58) Field of Classification Search
CPC .......................... G06F 12/0246; G06F 13/4221
See application file for complete search history.

(56) References Cited

U.S. PATENT DOCUMENTS

| | | | |
|---|---|---|---|
| 8,489,559 B2 | 7/2013 | Keithley et al. | |
| 10,168,997 B2 | 1/2019 | Souri et al. | |
| 10,275,385 B2 | 4/2019 | Kim et al. | |
| 10,691,417 B2 | 6/2020 | Souri et al. | |
| 10,789,253 B2 | 9/2020 | Fujimoto et al. | |
| 10,860,508 B2 | 12/2020 | Bolkhovitin et al. | |
| 11,068,544 B2 | 7/2021 | Kudryavtsev et al. | |
| 11,080,017 B2 | 8/2021 | Ramesh | |
| 2004/0148329 A1* | 7/2004 | Ogasawara | H04L 67/1097 709/200 |
| 2006/0069803 A1 | 3/2006 | Clark et al. | |
| 2010/0017565 A1* | 1/2010 | Kwon | G06F 3/0656 711/170 |
| 2015/0378932 A1 | 12/2015 | Souri et al. | |
| 2019/0073268 A1* | 3/2019 | Kantor | G06F 11/3636 |

(Continued)

FOREIGN PATENT DOCUMENTS

KR 10-2020-0143686 A 12/2024

*Primary Examiner* — Getente A Yimer
(74) *Attorney, Agent, or Firm* — Sughrue Mion, PLLC

(57) ABSTRACT

Disclosed are a computational storage device, an electronic system and an electronic device. The computational storage device includes a nonvolatile memory, a buffer memory, and a storage controller. The storage controller communicates with the nonvolatile memory and the buffer memory. The storage controller performs computational processing and data format conversion on first data input to the storage controller based on a storage processing table associated with an external electronic device to output second data.

19 Claims, 16 Drawing Sheets

(56) References Cited

U.S. PATENT DOCUMENTS

| | | | | |
|---|---|---|---|---|
| 2019/0320020 | A1* | 10/2019 | Lee | G06F 3/0611 |
| 2020/0050374 | A1* | 2/2020 | Yoon | G06F 12/0246 |
| 2021/0263746 | A1* | 8/2021 | Thom | G06F 3/0685 |
| 2021/0311871 | A1* | 10/2021 | Malladi | G06F 3/0629 |
| 2021/0390112 | A1 | 12/2021 | Ramesh | |
| 2022/0179818 | A1* | 6/2022 | Natu | G06F 13/4221 |

* cited by examiner

FIG. 5

| Module ID (MID) | Processing Type | Processing Module Type | | | | Enable /Disable | Status |
|---|---|---|---|---|---|---|---|
| | | Computational Module(CPTM) | Plug-In Module (PLGM) | IN | OUT | | |
| 1 | PTY1 | V | | V(RREQ) | V(WREQ) | Enabled | IN |
| 2 | PTY2 | | V | V(WREQ) | V(RREQ) | | |
| 3 | PTY3 | | V | | V(RREQ) | Enabled | OUT |
| 4 | PTY4 | | V | | V(RREQ) | Enabled | OUT |
| 5 | PTY5 | | V | | V(RREQ) | | |
| 6 | PTY6 | V | | V(RREQ) | V(WREQ) | | |
| 7 | PTY7 | | V | V(WREQ) | | | |
| 8 | PTY8 | | V | V(WREQ) | | | |
| 9 | PTY9 | | V | V(WREQ) | | | |
| 10 | PTY10 | | V | V(WREQ) | V(RREQ) | | |

FIG. 10

| Module ID (MID) | Processing Type | Processing Module Type | | | | Enable /Disable | Status |
|---|---|---|---|---|---|---|---|
| | | Computational Module(CPTM) | Plug-In Module (PLGM) | IN | OUT | | |
| 1 | PTY1 | V | | V(RREQ) | V(WREQ) | | |
| 2 | PTY2 | | V | V(WREQ) | V(RREQ) | | |
| 3 | PTY3 | | V | | V(RREQ) | | |
| 4 | PTY4 | | V | | V(RREQ) | | |
| 5 | PTY5 | | V | | V(RREQ) | | |
| 6 | PTY6 | V | | V(RREQ) | V(WREQ) | Enabled | OUT |
| 7 | PTY7 | | V | V(WREQ) | | Enabled | IN |
| 8 | PTY8 | | V | V(WREQ) | | Enabled | IN |
| 9 | PTY9 | | V | V(WREQ) | | Enabled | IN |
| 10 | PTY10 | | V | V(WREQ) | V(RREQ) | | |

FIG. 14

| Access Order | Electronic Device ID | CPTM ID | LBA | Size |
| --- | --- | --- | --- | --- |
| 1 | #1 | 1 | 0 | 8 |
| 2 | #2 | 6 | 8 | 6 |
| 3 | #1 | 1 | 14 | 10 |
| ⋮ | ⋮ | ⋮ | ⋮ | ⋮ |

COMPUTATIONAL STORAGE DEVICE, AND COMPUTATIONAL STORAGE SYSTEM AND ELECTRONIC SYSTEM INCLUDING THE SAME

CROSS-REFERENCE TO RELATED APPLICATIONS

This application is based on and claims priority under 35 U.S.C. § 119 to Korean Patent Application No. 10-2022-0079814 filed on Jun. 29, 2022, in the Korean Intellectual Property Office, the disclosures of which are incorporated by reference herein in their entireties.

BACKGROUND

Embodiments of the disclosure described herein relate to a semiconductor device, and more particularly, relate to a computational storage device, a computational storage system, an electronic system including the computational storage device, and methods of storing data in the computational storage device.

Generally, a storage device may include a storage controller, a buffer memory, a nonvolatile memory, etc. and may stably store a large amount of data generated in a digital environment. According to the recent edge computing technology, edge nodes (or edge devices) may instead perform data processing that is capable of being performed on a cloud. That is, the workload of the cloud may be efficiently distributed by utilizing the resources of the edge nodes.

A computational storage device may include an acceleration module (or an accelerator) and may process a part of data processing associated with an external electronic device by using the acceleration module. That is, the computational storage device may perform in-situ processing and may be actively utilized in the edge nodes belonging to the edge environment.

SUMMARY

Embodiments of the disclosure provide a computational storage device capable of being usefully used in a cloud environment where a cloud technology is utilized or an edge environment where an edge computing technology is utilized.

Embodiments of the disclosure provide a computational storage system and an electronic system including the computational storage device.

According to an aspect of the disclosure, there is provided a computational storage device including: a nonvolatile memory; a buffer memory; and a storage controller configured to: communicate with the nonvolatile memory and the buffer memory, and perform, based on first information in a storage processing table associated with an external electronic device, at least one of a computational processing and a data format conversion on first data input to the storage controller to output second data.

The first information may include: data processing information corresponding to data processing to be performed in the external electronic device, and data format information corresponding to a scheme to communicate with the external electronic device.

The storage controller may include an acceleration module, and wherein the acceleration module may include: one or more computational modules configured to perform the computational processing based on the data processing information; and one or more plug-in modules configured to perform the data format conversion based on the data format information.

The storage processing table may include an order of performing the computational processing and the data format conversion based on a type of a request from a host device.

Based on the request from the host device being a read request and based on the storage processing table indicating that the computational processing is performed prior to the data format conversion, the one or more computational modules may be configured to perform the computational processing on the first data, and the one or more plug-in modules may be configured to output the second data by performing the data format conversion on the first data on which the computational processing has been performed by the one or more computational modules.

Based on the request from the host device being a write request and based on the storage processing table indicating that the data format conversion is performed prior to the computational processing, the one or more plug-in modules may be configured to perform the data format conversion on the first data, and the one or more computational modules may be configured to output the second data by performing the computational processing on the first data on which the data format conversion has been performed by the one or more plug-in modules.

The storage controller may further include: a buffer memory interface including two or more interface channels, the buffer memory interface being configured to communicate with the one or more computational modules, the one or more plug-in modules, and the buffer memory through the two or more interface channels; and an acceleration module manager configured to control the one or more computational modules, the one or more plug-in modules, and the buffer memory interface based on the request from the host device and the storage processing table.

Based on the storage processing table indicating that the computational processing is performed prior to the data format conversion, the acceleration module manager may be configured to form one or more data paths, wherein each of the one or more data paths starts from the buffer memory interface, sequentially passes through the one or more computational modules and the one or more plug-in modules, and returns to the buffer memory interface.

The acceleration module manager may be configured to enable the one or more computational modules, the one or more plug-in modules, and the two or more interface channels based on the storage processing table, and wherein a number of the enabled interface channels may be equal to a sum of a number of the enabled computational modules and the number of the enabled plug-in modules.

The storage controller may further include: an acceleration module including one or more computational modules performing the computational processing, and a core module including a plurality of cores, wherein the core module may further include one or more plug-in modules performing the data format conversion.

A number of the plurality of cores may be more than or equal to a number of the one or more plug-in modules, and wherein the one or more plug-in modules may be respectively provided in one or more of the plurality of cores.

The acceleration module may include a first computational module, among the one or more computational modules, the first computational module being configured to perform the computational processing, wherein a first core, among the plurality of cores, may include a first plug-in module, among the one or more plug-in modules, the first core being configured to perform first data format conversion, wherein a second core, among the plurality of cores, may include a second plug-in module, among the one or more plug-in modules, the second core being configured to perform second data format conversion, and wherein, based on a request from a host device being a write request and based on the storage processing table indicating that the data format conversion is performed prior to the computational processing, the first plug-in module may be configured to perform the first data format conversion on a first data component of the first data, the second plug-in module may be configured to perform the second data format conversion on a second data component of the first data, and the first computational module may be configured to output the second data by performing a first computational processing on first output data of the first plug-in module and second output data of the second plug-in module.

One of the first data and the second data may have a data format suitable for one of communication with the external electronic device and a data processing to be performed in the external electronic device, and the other of the first data and the second data may have a data format suitable for the computational processing to be performed in the storage controller.

One of the first data and the second data may be received from the external electronic device, and the other of the first data and the second data may be output to the nonvolatile memory.

According to another aspect of the disclosure, there is provided an electronic system including: a first electronic device; and a second electronic device configured to communicate with the first electronic device, wherein the first electronic device includes a host device and a computational storage device, wherein the computational storage device includes: a nonvolatile memory; a buffer memory; and a storage controller configured to: communicate with the nonvolatile memory and the buffer memory, and perform, based on first information in a first storage processing table associated with the host device and a second storage processing table associated with the second electronic device, at least one of a computational processing and a data format conversion on first data input to the storage controller to output second data.

One of the first data and the second data may have a data format suitable for one of communication with the second electronic device and a data processing to be performed in the host device, and the other of the first data and the second data may have a data format suitable for the computational processing to be performed in the storage controller.

One of the first data and the second data may be received from one of the second electronic device and the host device, and the other of the first data and the second data may be output to the nonvolatile memory.

The second data may be transferred to one of the second electronic device and the host device, and wherein when each of the second electronic device and the host device receives the second data, each of the second electronic device and the host device may perform data processing without additional data format conversion.

The buffer memory may include a first storage region associated with the host device and a second storage region associated with the second electronic device, wherein the first data or the second data are written in the first storage region based on the first storage processing table or are read from the first storage region based on the first storage processing table, and wherein the first data or the second data are written in the second storage region based on the second storage processing table or are read from the second storage region based on the second storage processing table.

According to another aspect of the disclosure, there is provided an electronic device including: a host device; a compute express link (CXL) switch; a CXL memory device; and a CXL storage device including a CXL storage controller, the CXL storage device configured to: communicate with the host device and the CXL memory device through the CXL switch, and perform, based on information in a storage processing table associated with an external electronic system or the host device, computational processing and data format conversion on first data input to the CXL storage controller to output second data.

BRIEF DESCRIPTION OF DRAWINGS

The above and other objects and features of the disclosure will become apparent by describing in detail embodiments thereof with reference to the accompanying drawings.

FIG. 5 is a diagram for describing a storage processing table of FIGS. 1 and 2.

FIG. 10 is a diagram for describing a storage processing table of FIGS. 1 and 2.

FIGS. 14 and 15 are diagrams for describing a process where data are written in a buffer memory of FIG. 12 or a process where data are read from the buffer memory.

DETAILED DESCRIPTION

Below, embodiments of the disclosure will be described in detail and clearly to such an extent that one skilled in the art easily carries out the disclosure.

Figure 1:
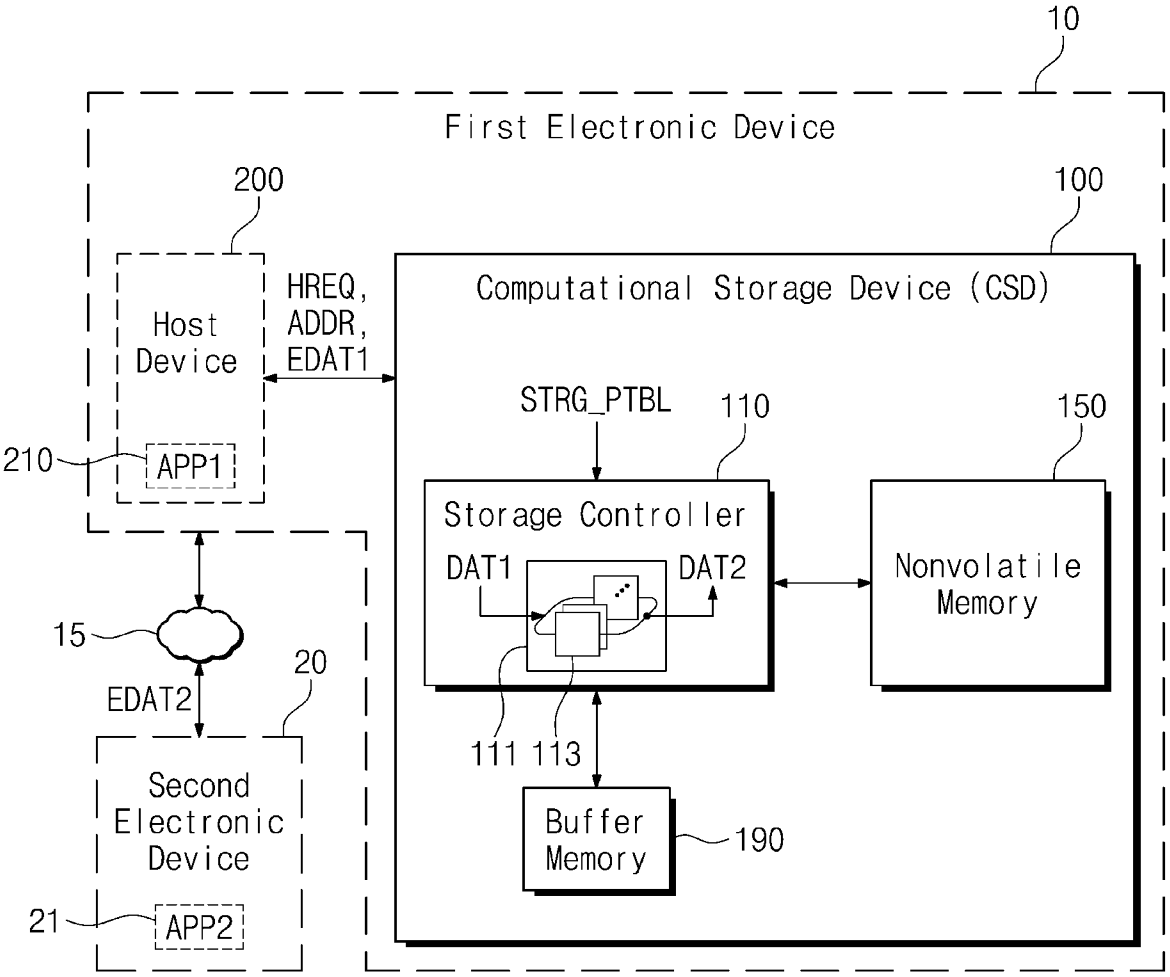
FIG. 1 is a block diagram illustrating a computational storage device according to an example embodiment of the disclosure.

FIG. 1 is a block diagram illustrating a computational storage device according to an example embodiment of the disclosure.

Referring to FIG. 1, a computational storage device 100 includes a storage controller 110, a nonvolatile memory 150, and a buffer memory 190. The storage controller 110 may communicate with the nonvolatile memory 150 and the buffer memory 190 to send/receive data.

In an example embodiment, the computational storage device 100, which includes the storage controller 110, may be included in a first electronic device 10 together with a host device 200. The host device 200 may send a request HREQ and an address ADDR to the computational storage device 100 and may communicate with the computational storage device 100 to send/receive data EDAT1. The computational storage device 100 including the storage controller 110 may communicate with a second electronic device 20 placed outside and may send/receive data EDAT2.

In an example embodiment, the data EDAT1 may correspond to the request HREQ and/or the address ADDR. According to another example embodiment, the data EDAT1 may include information necessary for the operation of the storage controller 110 included in the computational storage device 100.

The storage controller 110 may receive first data DAT1 from the outside, and may generate second data DAT2 by variously processing and converting the first data DAT1. According to an example embodiment, the storage controller 110 may receive first data DAT1 from a device or an component external to the storage controller, and the storage controller 110 may generate second data DAT2 by variously processing and converting the first data DAT1. The storage controller 110 may include an acceleration module 111, and the acceleration module 111 may include processing modules 113 performing computations and conversions.

In an example embodiment, each of the acceleration module 111 and the processing modules 113 may correspond to a hardware module, a software module, or a combination of hardware and software modules. According to an example embodiment, the hardware module may be implemented by one or more electronic components such as processors, circuits, etc. According to an example embodiment, when each of the acceleration module 111 and the processing modules 113 corresponds to the hardware module, each of the acceleration module 111 and the processing modules 113 may execute a firmware program for driving the hardware module. According to an example embodiment, when each of the acceleration module 111 and the processing modules 113 corresponds to the software module, each of the acceleration module 111 and the processing modules 113 may be referred to as a "computational storage program", which may be executed by one or more processors to perform operations of the storage controller 110. The acceleration module 111 and the processing modules 113 will be described with reference to FIGS. 2, 3, and 6.

In an example embodiment, the first data DAT1 may be data that are input to the storage controller 110 from outside storage controller 110 through various paths, and the second data DAT2 may be data that are output to the outside from the storage controller 110 through various paths. For example, when the first data DAT1 or the second data DAT2 pass through the buffer memory 190 (e.g., first data DAT1 or the second data DAT2 are temporarily stored in the buffer memory 190) in each of the process where the first data DAT1 are input from the host device 200 or the nonvolatile memory 150 and the process where the second data DAT2 are output to the host device 200 or the nonvolatile memory 150, the first data DAT1 may be input from the buffer memory 190, and the second data DAT2 may be output to the buffer memory 190. Below, for convenience, the description will be given under the assumption that the first data DAT1 are received from the buffer memory 190 and the second data DAT2 are output to the buffer memory 190, but this is provided only as an example. As such, the disclosure is not limited to the example embodiment, and as such, according to another example embodiment, the first data DAT1 may be received from another component or device, and the second data DAT2 may be output to another component or device. In another example embodiment, only one of the first data DAT1 and the second data DAT2 may pass through the buffer memory 190, or both the first data DAT1 and the second data DAT2 may be input or output to or from the storage controller 110 without passing through the buffer memory 190. For example, when the request HREQ from the host device 200 is a read request, the first data DAT1 may be received from the nonvolatile memory 150, and the second data DAT2 may be output to the host device 200; when the request HREQ from the host device 200 is a write request, the first data DAT1 may be received from the host device 200, and the second data DAT2 may be output to the nonvolatile memory 150.

In an example embodiment, the computations and the conversions that are performed on the first data DAT1 may be based on a storage processing table STRG_PTBL associated with an external electronic device. For example, the first electronic device 10 may communicate with the second electronic device 20 over a network 15, and the external electronic device may include the host device 200 and/or the second electronic device 20. For example, the storage processing table STRG_PTBL may be provided from the host device 200, and may include data processing information corresponding to data processing to be performed in the external electronic device and data format information corresponding to the scheme to communicate with the external electronic device. For example, the storage processing table STRG_PTBL may indicate the processing modules 113 that are enabled for a particular external electronic device, and the computations and the conversions may be performed based on the enabled processing modules 113. For example, the computations and the conversions may include computational processing and data format conversion, and the computational processing and the data format conversion may be performed on pieces of data that are received from the specific external electronic device or may be performed on pieces of data that are output to the particular external electronic device. According to an example embodiment, the storage processing table STRG_PTBL may indicate the processing modules 113 that are enabled separately and/or independently for each of a plurality of external electronic devices, and the computations and the conversions may be performed based on the enabled processing modules 113.

In an example embodiment, the storage processing table STRG_PTBL may indicate the order of the computational processing and the data format conversion based on the request HREQ from the host device 200. The storage processing table STRG_PTBL will be described with reference to FIGS. 2, 5, and 10.

In an example embodiment, the host device 200 may execute a first application (APP1) 210, the second electronic device 20 may execute a second application (APP2) 21, and data processing that is performed in the external electronic device may include various processing operations that are performed by the first application 210 or the second application 21.

In an example embodiment, the computational storage device 100 may communicate with the host device 200 through a host interface, the first electronic device 10 may communicate with the second electronic device 20 over the network 15, and the scheme to communicate with the external electronic device may include various protocols that are used in the host interface or the network 15. For example, the host interface may include SATA (Serial-ATA), mSATA (mini-SATA), PCIe (Peripheral Component Interconnect express), M.2 and NVMe (nonvolatile-memory express) interfaces, and the network 15 may include a PAN (Personal Area Network), an LAN (Local Area Network), an MAN (Metropolitan Area Network), a WAN (Wide Area Network), a VAN (Value Added Network), and an ISDN (Integrated Service Digital Network).

In an example embodiment, the storage controller 110 may further include a buffer memory interface that performs communication with the buffer memory 190, and may further include an acceleration module manager that controls the processing modules 113 and the buffer memory interface. For example, the buffer memory interface may include two or more interface channels, and the acceleration module manager may selectively enable the two or more interface channels.

In an example embodiment, the nonvolatile memory 150 may include a plurality of NAND flash memories. In another embodiment, the nonvolatile memory 150 may include an EEPROM (Electrically Erasable Programmable Read-Only Memory), a PRAM (Phase Change Random Access Memory), an RRAM (Resistance Random Access Memory), an NFGM (Nano Floating Gate Memory), a PoRAM (Polymer Random Access Memory), an MRAM (Magnetic Random Access Memory), an FRAM (Ferroelectric Random Access Memory), or memories similar thereto.

In an example embodiment, the buffer memory 190 may include a volatile memory such as a DRAM (Dynamic Random Access Memory).

In an example embodiment, the computational storage device 100 may be a solid state drive (SSD). In another embodiment, the computational storage device 100 may be UFS (Universal Flash Storage), an MMC (Multi Media Card), or an eMMC (embedded MMC). In another embodiment, the computational storage device 100 may be implemented with an SD (Secure Digital) card, a micro SD card, a memory stick, a chip card, an USB (Universal Serial Bus) card, a smart card, a CF (Compact Flash) card, and any other device similar thereto.

In an example embodiment, the first electronic device 10 may include an arbitrary computing device such as a PC (Personal Computer), a digital television (TV), or a set-top box; in another embodiment, the first electronic device 10 may be an arbitrary mobile device such as a mobile phone, a smartphone, a tablet PC, a laptop computer, a PDA (Personal Digital Assistant), a PMP (Portable Multimedia Player), a digital camera, a camcorder, a portable game console, a music player, a video player, a navigation system, a wearable device, an IoT (Internet of Things) device, an e-book, a VR (Virtual Reality) device, an AR (Augmented Reality) device, or a drone.

In an example embodiment, the second electronic device 20 may be an arbitrary computing system such as a server computer, a data center, or a workstation.

According to the above configuration, a computational storage device of the disclosure may perform data processing to be performed in an external electronic device and data format conversion for communication with the external electronic device, based on a storage processing table including data processing information and data format information.

According to an example embodiment, even in a case where an external data format being a data format of data received from the outside of the computational storage device and an internal data format being a data format of data communicated internally within the computational storage device does not coincide with each other, the computational storage device may convert the external data format into the internal data format or the internal data format into the external data format such that a firmware program (or a computational storage program) is used without modification (or without the replacement or version update of the firmware program). That is, the reusability of the firmware program may be improved.

The computational storage device may efficiently manage a hardware resource of each of an acceleration module and a buffer memory interface by selectively enabling interface channels included in the acceleration module and interface channels included in the buffer memory interface based on the storage processing table.

Figure 2:
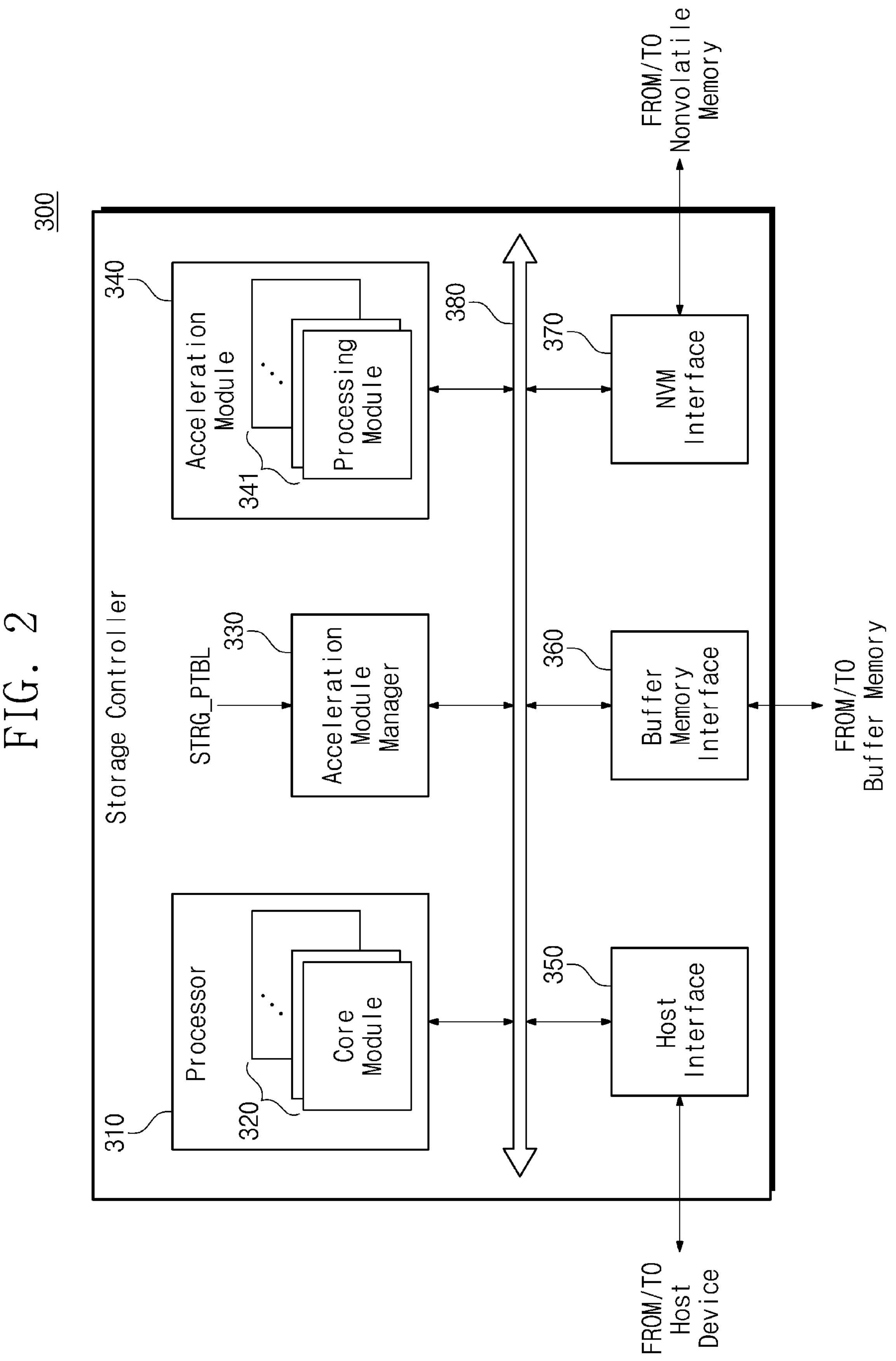
FIG. 2 is a block diagram illustrating a storage controller of FIG. 1.

FIG. 2 is a block diagram illustrating a storage controller of FIG. 1.

Referring to FIG. 2, a storage controller 300 may correspond to the storage controller 110 of FIG. 1 and may include a processor 310, an acceleration module manager 330, an acceleration module 340, a host interface 350, a buffer memory interface 360, and a nonvolatile memory interface 370. According to an example embodiment, the storage controller 300 may include a bus 380, which facilitates communication between the components of the storage controller 300. For example, one or more of the processor 310, the acceleration module manager 330, the acceleration module 340, the host interface 350, the buffer memory interface 360, and the nonvolatile memory interface 370 communicate with each other by using the bus 380.

According to an example embodiment, the processor 310 may include one or more core modules 320 and the acceleration module may include processing modules 341. According to an example embodiment, the processor 310 may control overall operations of the components included in the storage controller 300 based on requests received from a host device (e.g., 200 of FIG. 1) through the host interface 350. For example, the processor 310 may control operations of one or more of the core modules 320, the acceleration module manager 330, the acceleration module 340, the processing modules 341, the host interface 350, the buffer memory interface 360, the nonvolatile memory interface 370 and the bus. In embodiments of FIGS. 3 and 6, the processor 310 may be implemented with a single core and may not participate in the operations of processing modules 341; in an example embodiment of FIG. 9, the processor 310 may be implemented with two or more cores and may participate in the operations of processing modules 341.

The acceleration module 340 may include the processing modules 341 and may perform the computations and the conversions (or the computational processing and the data format conversion), which are described with reference to FIG. 1, by using the processing modules 341. For example, the acceleration module 340 may perform the computational processing based on the data processing information and may perform the data format conversion based on the data format information.

The storage controller 300 may communicate with a host device by using the host interface 350, may communicate with a buffer memory by using the buffer memory interface 360, and may communicate with a nonvolatile memory by using the nonvolatile memory interface 370. For example, the buffer memory interface 360 may include two or more interface channels, and the acceleration module 340 may communicate with the buffer memory by using the interface channels.

The acceleration module manager 330 may receive a request and the storage processing table STRG_PTBL from the host device. The acceleration module manager 330 may control the acceleration module 340 and the buffer memory interface 360 based on the request and the storage processing table STRG_PTBL and the acceleration module manager 330 may control the buffer memory within the range of performing the computational processing and the data format conversion according to an example embodiment of the disclosure. That is, the acceleration module manager 330 may directly control the buffer memory instead of the processor 310. However, the disclosure is not limited thereto, and as such, according to another example embodiment, the acceleration module manager 330 may involve other components to control the buffer memory. As will be described with reference to FIGS. 3, 6, 8, 9, and 11, the acceleration module manager 330 may generate control signals for the purpose of controlling the acceleration module 340, the buffer memory interface 360, and the buffer memory.

In an example embodiment, the storage controller 300 may further include an advanced encryption standard (AES) engine, a flash translation layer, and an error correction code (ECC) block. The AES engine may encrypt and decrypt pieces of data by using the AES algorithm. The flash translation layer may translate a logical data address (e.g., a logical block address (LBA)) provided from the host device into a physical data address (e.g., a physical block address (PBA)) by using address mapping information. The ECC block may perform ECC encoding and ECC decoding by using a BCH (Bose-Chaudhuri-Hocquenghem) code, an LDPC (Low Density Parity Check) code, a turbo code, a Reed-Solomon code, a convolution code, an RSC (Recursive Systematic Code), coded modulation, such as TCM (Trellis-Coded Modulation) or BCM (Block Coded Modulation), or any other error correction code.

Figure 3:
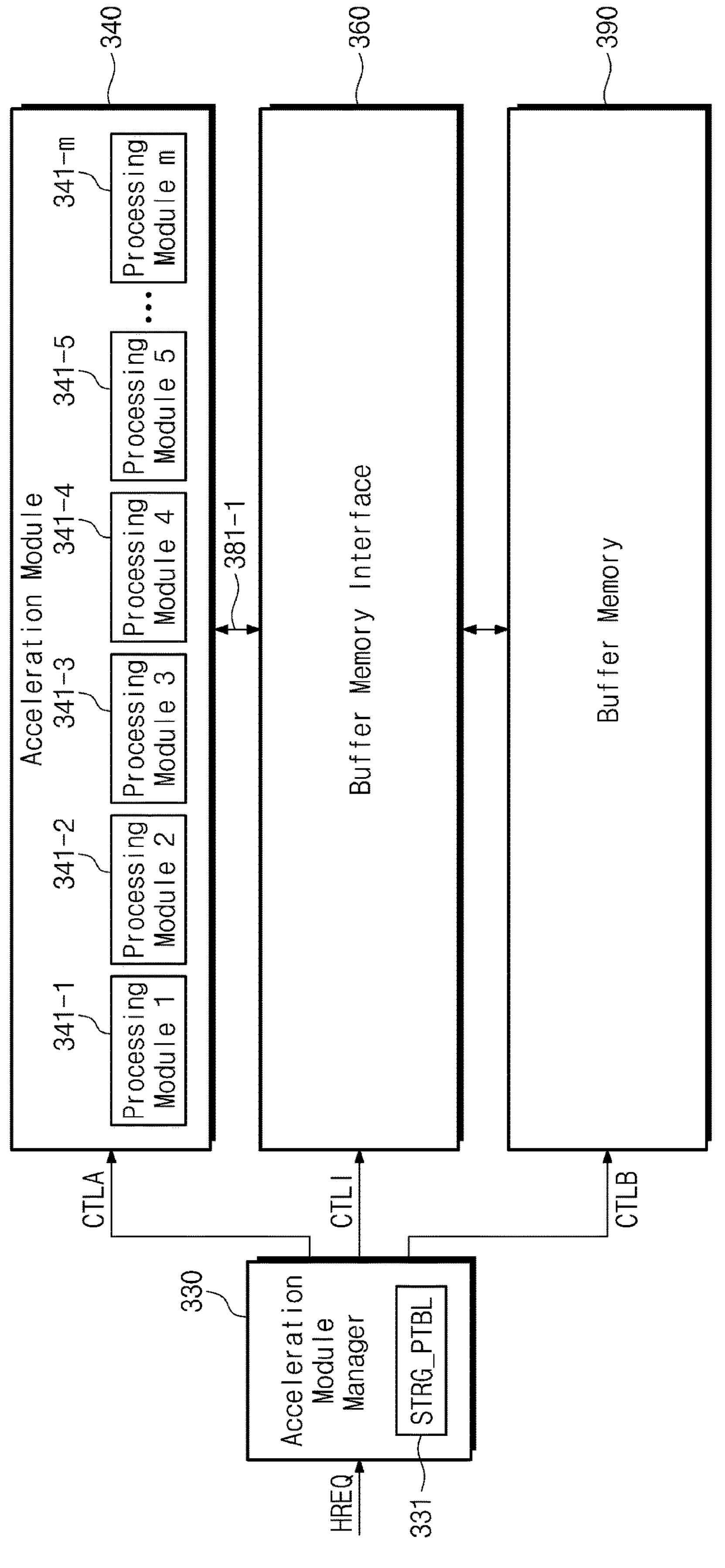
FIG. 3 is a block diagram illustrating an example embodiment of a buffer memory of FIG. 1 and some of components included in a storage controller of FIG. 2.

FIG. 3 is a block diagram illustrating an example embodiment of a buffer memory of FIG. 1 and some of components included in a storage controller of FIG. 2.

The acceleration module manager 330, the acceleration module 340, the buffer memory interface 360, and a buffer memory 390 are illustrated in FIG. 3.

In FIGS. 2 and 3, components that are marked by the same reference numeral/sign may be substantially the same components. For example, the acceleration module manager 330 may receive the request HREQ and a storage processing table 331 from a host device and may control the acceleration module 340, the buffer memory interface 360, and the buffer memory 390 based on the request HREQ and the storage processing table 331. The acceleration module manager 330 may generate a control signal CTLA to control the acceleration module 340, may generate a control signal CTLI to control the buffer memory interface 360, and may generate a control signal CTLB to control the buffer memory 390.

The acceleration module 340 may include processing modules 341-1, 341-2, 341-3, 341-4, 341-5, . . . , 341-*m* (m being a natural number of 6 or more), each of which performs one of the computational processing and the data format conversion described with reference to FIG. 2. All the processing modules 341-1 to 341-*m* may be included in the acceleration module 340 as illustrated in FIG. 3 and as will be described with reference to FIGS. 6 and 8, but the disclosure is not limited thereto. As will be described with reference to FIGS. 9 and 11, some of the processing modules 341-1 to 341-*m* may be included in the acceleration module 340, and the others thereof may be included in any other module, not the acceleration module 340.

In an example embodiment, the storage processing table 331 may include data processing information corresponding to data processing that is performed in an external electronic device and data format information corresponding to the scheme to communicate with the external electronic device. According to an example embodiment, all or some of the processing modules 341-1 to 341-*m* may perform the computational processing corresponding the data processing information and the data format conversion corresponding to the data format information.

In an example embodiment, the acceleration module manager 330 may form one or more data paths (e.g., 381-1), each of which starts from the buffer memory interface 360, passes through all or some of the processing modules 341-1 to 341-*m*, and returns to the buffer memory interface 360, such that all or some of the processing modules 341-1 to 341-*m* perform the computational processing and the data format conversion.

Figure 4:
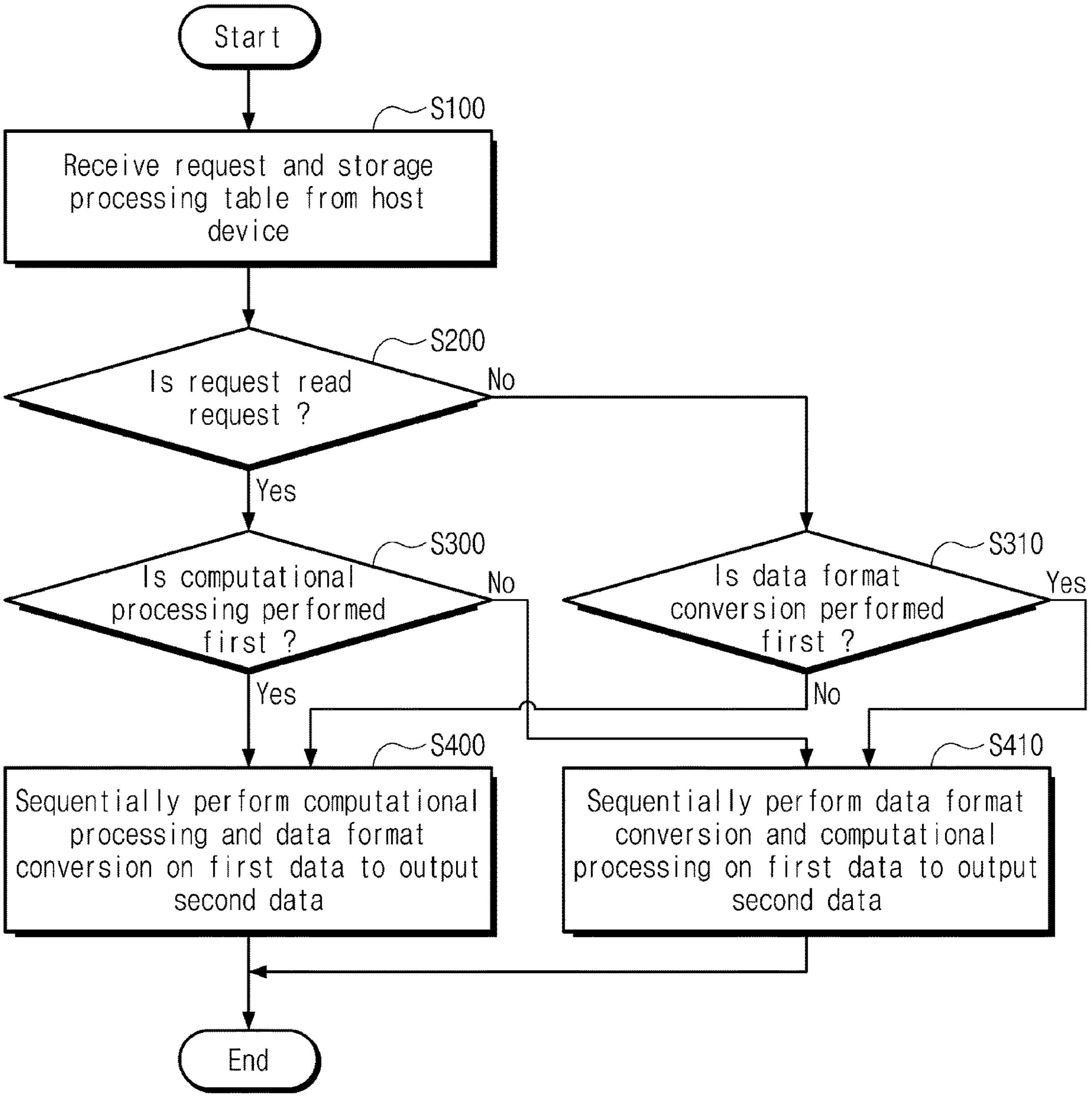
FIG. 4 is a flowchart for describing operations of a storage controller of FIG. 3.

FIG. 4 is a flowchart for describing operations of a storage controller of FIG. 3.

Referring to FIGS. 3 and 4, in operation S100, the acceleration module manager 330 may receive the request HREQ and the storage processing table 331 from a host device.

In an example embodiment, the storage processing table 331 may include the data processing information and the data format information. The data processing information may correspond to data processing that is performed in a particular external electronic device, and the data format information may correspond to the scheme to communicate with the particular external electronic device. According to an example embodiment, the storage processing table 331 may include the data processing information and the data format information respectively stored for a plurality of external electronic devices. For example, the storage processing table 331 may include first data processing information corresponding to data processing that is performed in a first external electronic device, and first format information corresponding to the scheme to communicate with the first external electronic device. Moreover, the storage processing table 331 may include second data processing information corresponding to data processing that is performed in a second external electronic device, and second format information corresponding to the scheme to communicate with the second external electronic device. The acceleration module 340 may perform computational processing and data format conversion based on the data processing information and the data format information.

In an example embodiment, the storage processing table 331 may indicate the order of the computational processing and the data format conversion that are performed on pieces of data received from the specific external electronic device or to be output to the specific external electronic device based on a type of the request HREQ from the host device.

According to an example embodiment, in operation S200, the acceleration module manager 330 may determine whether the request HREQ from the host device is a read request. In operations S300 and S310, the acceleration module manager 330 may determine which of the computational processing (S300) and the data format conversion (S310) is first performed, based on the storage processing table 331.

The acceleration module manager 330 may generate second data by controlling the acceleration module 340 (or two or more of the processing modules 341-1 to **341-*m*) based on results of the determinations in operation S200, operation S300, and operation S310 such that the computational processing and the data format conversion are sequentially performed on first data input to a storage controller (e.g., 300 of FIG. 2) in a given order (S400 and S410**).

For example, when the request HREQ from the host device is the read request (Yes in S200) and when the storage processing table 331 indicates that the computational processing is performed prior to the data format conversion (Yes in S300), the computational processing may be performed on the first data, and the data format conversion may then be performed on the first data experiencing the computational processing (S400).

For example, when the request HREQ from the host device is the read request (Yes in S200) and when the storage processing table 331 indicates that the data format conversion is performed prior to the computational processing (No in S300), the data format conversion may be performed on the first data, and the computational processing may then be performed on the first data experiencing the data format conversion (S410).

For example, when the request HREQ from the host device is the write request (No in S200) and when the storage processing table 331 indicates that the data format conversion is performed prior to the computational processing (Yes in S310), the data format conversion may be performed on the first data, and the computational processing may then be performed on the first data experiencing the data format conversion (S410).

For example, when the request HREQ from the host device is the write request (No in S200) and when the storage processing table 331 indicates that the computational processing is performed prior to the data format conversion (No in S310), the computational processing may be performed on the first data, and the data format conversion may then be performed on the first data experiencing the computational processing (S400).

FIG. 5 is a diagram for describing a storage processing table of FIGS. 1 and 2.

Referring to FIGS. 1, 2, and 5, a storage processing table may include at least the following columns: a module ID (MID), a processing type, a processing module type, an enable/disable of a processing module, and a state of a processing module.

The module ID may be allocated to each of processing modules (e.g., 113 of FIG. 1, 341 of FIG. 2, or 341-1 to **341-*m* of FIG. 3**), and may be used to distinguish the processing modules. For example, the module ID may be used to indicate processing modules that are enabled with regard to a specific external electronic device.

Each of the processing modules may perform one of computational processing and data format conversion, and each of processing types PTY1, PTY2, PTY3, PTY4, PTY5, PTY6, PTY7, PTY8, PTY9, and PTY10 may indicate, in detail, one of the computational processing and the data format conversion that a processing module having a corresponding module ID performs. For example, the processing type PTY1 may indicate "MPEG conversion", the processing type PTY2 may indicate "TCP/IP conversion", the processing type PTY3 may indicate "MPEG 480×480", the processing type PTY4 may indicate "MPEG 640×480", and the processing type PTY5 may indicate "MPEG 1024×768". The numbers after "MPEG" of each of the processing types PTY3 to PTY5 may mean the resolution or size of image data. For example, the processing type PTY6 may indicate "3D Photo conversion", the processing type PTY7 may indicate "X-axis conversion", the processing type PTY8 may indicate "Y-axis conversion", and the processing type PTY9 may indicate "Z-axis conversion". For example, the processing type PTY10 may indicate a protocol manner for serialization of structured data. A total of 10 computational processing and data format conversion types are illustrated in FIG. 5, but the number of computational processing and data format conversion types is provided only as an example. For example, the content of computational processing and data format conversion indicated by each of the processing types PTY1 to PTY10 may also be variously changed.

The processing module type may indicate computational processing and data format conversion that are performed based on the enabled processing modules and may indicate the order of the computational processing and the data format conversion.

In an example embodiment, column "CPTM" may indicate that a corresponding processing module corresponds to a computational module, and column "PLGM" may indicate that a corresponding processing module corresponds to a plug-in module. The computational module may be a module that performs the computational processing, and the plug-in module may be a module that performs the data format conversion.

In an example embodiment, column "IN" may indicate that a corresponding processing module operates on an input path, and column "OUT" may indicate that a corresponding processing module operates on an output path. The input path may be a path through which data are input to a storage controller, and the output path may be a path through which the data input through the input path are output from the storage controller. In column "IN" and column "OUT", RREQ may indicate that an operation is performed in response to a read request from a host device, and WREQ may indicate that an operation is performed in response to a write request from the host device. A processing module that operates on the input path may operate prior to a processing module that operates on the output path.

For example, in the case of a processing module whose module ID is "1", when column "CPTM", column "IN", and column "OUT" are marked by "V", the processing module whose module ID is "1" may correspond to the computational module, not the plug-in module, may operate on the input path in response to the read request from the host device, and may operate on the output path in response to the write request from the host device. Each of processing modules whose module IDs are "2" to "10" may operate to be similar to the processing module whose module ID is "1", based on the storage processing table.

For example, a computational storage device according to the disclosure may operate when the processing modules whose module IDs are "1", "3", and "4" are enabled with regard to a specific external electronic device and when a request from the host device is the read request. The processing module whose module ID is "1" may operate as the computational module, and each of the processing modules whose module IDs are "3" and "4" may operate as the plug-in module. The processing module whose module ID is "1" may operate on the input path, and the processing modules whose module IDs are "3" and "4" may operate on the output path. In this case, the processing module whose module ID is "1" may perform the "MPEG compression" on first data input to a storage controller included in the computational storage device and may output first result data to the processing modules whose module IDs are "3" and "4"; the processing modules whose module IDs are "3" and "4" may perform data format conversions of "MPEG 480×480" and "MPEG 640×480" on the first result data and may output second result data as second data.

The enable/disable of the processing module may indicate whether a corresponding processing module is enabled currently (i.e., in real time), and the state of the processing module may indicate whether a corresponding processing module operates on any of the input path and the output path currently (i.e., in real time). For example, because "Enabled" is marked in the enable/disable columns of the processing modules whose module IDs are "1", "3", and "4", "IN" is marked in the status column of the processing module whose module ID is "1", and "OUT" is marked in the status columns of the processing modules whose module IDs are "3" and "4", the storage processing table may indicate that the processing modules whose module IDs are "1", "3", and "4" are currently enabled, the processing module whose module ID is "1" is operating on the input path, and the processing modules whose module IDs are "3" and "4" are operating on the output path.

Figure 6:
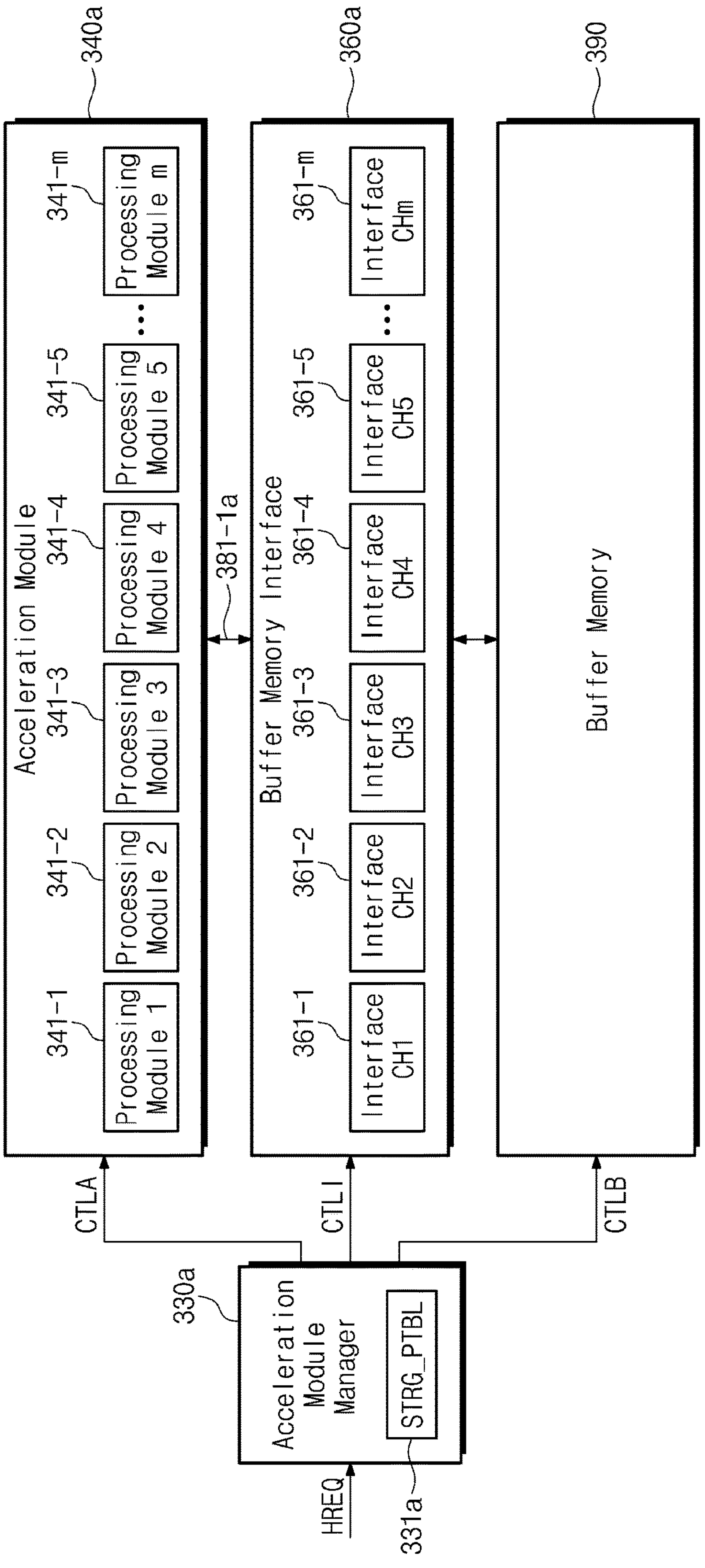
FIG. 6 is a block diagram illustrating an example embodiment of a buffer memory of FIG. 1 and some of components included in a storage controller of FIG. 2.

FIG. 6 is a block diagram illustrating an example embodiment of a buffer memory of FIG. 1 and some of components included in a storage controller of FIG. 2.

Referring to FIGS. 2, 3, and 6, components 330*a*, 331*a*, 340*a*, 381-1*a*, and 390 illustrated in FIG. 6 may respectively correspond to the components 330, 331, 340, 381-1, and 390 illustrated in FIG. 3 and may perform substantially the same functions as the components 330, 331, 340, 381-1, and 390. Thus, additional description will be omitted to avoid redundancy.

According to an example embodiment, a buffer memory interface 360*a* may include interface channels (CH) 361-1, 361-2, 361-3, 361-4, 361-5, . . . , 361-*m* (m being a natural number of 6 or more). In an example embodiment, the number of interface channels 361-1 to 361-*m* may be equal to the number of processing modules 341-1, 341-2, 341-3, 341-4, 341-5, . . . , 341-*m*, the interface channels 361-1 to 361-*m* may respectively correspond to the processing modules 341-1, 341-2, 341-3, 341-4, 341-5, . . . , 341-*m*. However, the number of interface channels 361-1 to 361-*m* is not limited to the number illustrated FIG. 6. For example, according to another embodiment, number of interface channels 361-1 to 361-*m* may be two or more. In another example embodiment, the number of interface channels 361-1 to 361-*m* may be less than the number of processing modules 341-1, 341-2, 341-3, 341-4, 341-5, . . . , 341-*m* depending on a peripheral network environment or a hardware resource of a computational storage device.

In an example embodiment, the processing modules 341-1, 341-2, 341-3, 341-4, 341-5, . . . , 341-*m* may include one or more computational modules and one or more plug-in modules, and the buffer memory interface 360*a* may communicate with the one or more computational modules, the one or more plug-in modules, and the buffer memory 390 by using the interface channels 361-1 to 361-*m*.

In an example embodiment, based on the storage processing table 331*a*, the acceleration module manager 330*a* may enable the one or more computational modules, the one or more plug-in modules and may enable two or more of the interface channels 361-1 to 361-*m*. In this case, the acceleration module manager 330*a* may enable interface channels as much as a sum of the number of enabled computational modules and the number of enabled plug-in modules and thus may efficiently manage the hardware resource of the buffer memory interface 360*a*.

Figure 7:
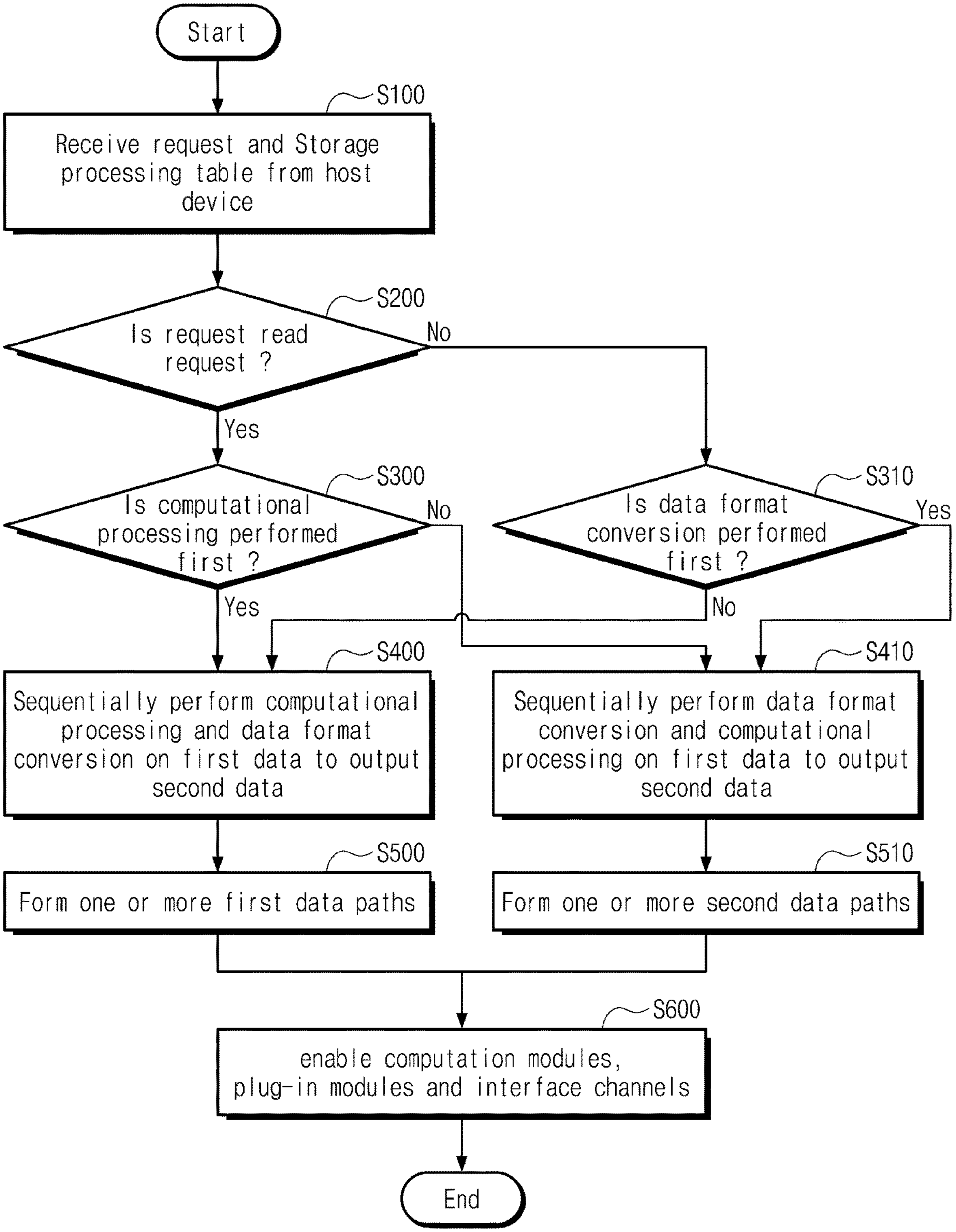
FIG. 7 is a flowchart for describing operations of a storage controller of FIG. 6.

FIG. 7 is a flowchart for describing operations of a storage controller of FIG. 6.

Operation S100, operation S200, operation S300, operation S310, operation S400, operation S410 of FIG. 6 are substantially the same as operation S100, operation S200, operation S300, operation S310, operation S400, operation S410 of FIG. 4, and thus, the same description will be omitted to avoid redundancy.

Referring to FIGS. 4, 6, and 7, in operation S100, the acceleration module manager 330*a* may receive the request HREQ and the storage processing table 331*a* from a host device.

In an example embodiment, the storage processing table 331*a* may indicate the order of performing the computational processing and the data format conversion based on the request HREQ from the host device.

According to an example embodiment, in operation S200, the acceleration module manager 330*a* may determine whether the request HREQ from the host device is the read request, and in operation S300 and S310, the acceleration module manager 330*a* may determine which of the computational processing (S300) and the data format conversion (S310) is first performed, based on the storage processing table 331*a* based on a result of the determination in operation S200.

The acceleration module manager 330*a* may generate second data by controlling the acceleration module 340*a* (or two or more of the processing modules 341-1 to 341-*m*) based on results of the determinations in operation S200, operation S300, and operation S310 such that the computational processing and the data format conversion are sequentially performed on first data input to a storage controller (e.g., 300 of FIG. 2) in a given order (S400 and S410).

In an example embodiment, the processing modules 341-1 to 341-*m* may include one or more computational modules and one or more plug-in modules.

According to an example embodiment, the acceleration module manager 330*a* may form one or more first data paths (S500) or may form one or more second data paths (S510).

In an example embodiment, when the computational processing is performed prior to the data format conversion, the first data paths may indicate one or more paths, each of which starts from the buffer memory interface 360*a*, sequentially passes through the one or more computational modules and the one or more plug-in modules, and returns to the buffer memory interface 360*a*. For example, when the request HREQ from the host device is the read request (Yes in S200) and when the storage processing table 331*a* indicates that the computational processing is performed prior to the data format conversion (Yes in S300), the acceleration module manager 330*a* may form the one or more first paths. For example, when the request HREQ from the host device is the read request (Yes in S200) and when the storage processing table 331 indicates that the data format conversion is performed prior to the computational processing (No in S300), the acceleration module manager 330*a* may form the one or more second data paths (S500).

In an example embodiment, when the data format conversion is performed prior to the computational processing, the second data paths may indicate one or more paths, each of which starts from the buffer memory interface 360*a*, sequentially passes through the one or more plug-in modules and the one or more computational modules, and returns to the buffer memory interface 360*a*. For example, when the request HREQ from the host device is the write request (No in S200) and when the storage processing table 331*a* indicates that the data format conversion is performed prior to the computational processing (Yes in S310), the acceleration module manager 330*a* may form the one or more second paths. For example, when the request HREQ from the host device is the write request (No in S200) and when the storage processing table 331*a* indicates that the computational processing is performed prior to the data format conversion (No in S310), the acceleration module manager 330*a* may form the one or more first paths.

The acceleration module manager 330*a* may enable the one or more computational modules, the one or more plug-in modules, and two or more of the interface channels 361-1 to 361-*m* that are provided on the first data paths or the second data paths, based on the storage processing table 331*a*.

Figure 8:
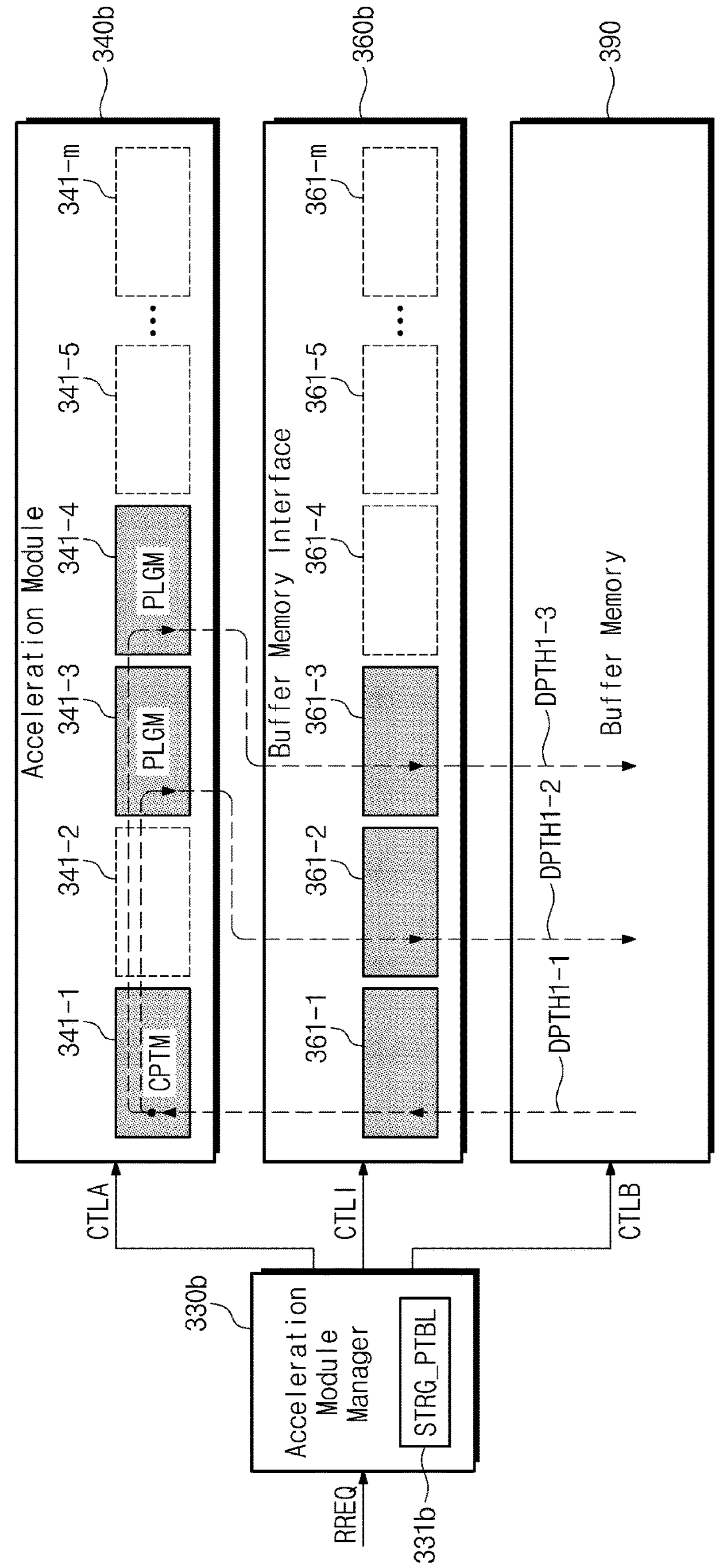
FIG. 8 is a diagram for describing an operation of a buffer memory and some of components included in a storage controller of FIG. 6.

FIG. 8 is a diagram for describing an operation of a buffer memory and some of components included in a storage controller of FIG. 6.

An example where a computational storage device according to the disclosure operates when a request from a host device is a read request RREQ and a storage processing table 331*b* indicates that processing modules whose module IDs are "1", "3", and "4" are enabled is illustrated in FIG. 8.

According to an example embodiment, an acceleration module manager 330*b*, the storage processing table 331*b*, an acceleration module 340*b*, a buffer memory interface 360*b*, and the buffer memory 390 of FIG. 8 may respectively correspond to the acceleration module manager 330*a*, the storage processing table 331*a*, the acceleration module 340*a*, the buffer memory interface 360*a*, and the buffer memory 390 of FIG. 6. The storage processing table 331*b* may correspond to the storage processing table illustrated in FIG. 5.

Referring to FIGS. 5, 6, and 8, the acceleration module 340*b* may include the processing modules 341-1 to 341-*m*, and the buffer memory interface 360*b* may include the interface channels 361-1 to 361-*m*. The processing modules whose module IDs are "1", "3", and "4" may be the processing modules 341-1, 341-3, and 341-4.

When the request from the host device is the read request RREQ and when the storage processing table 331*b* indicates that the computational processing is performed prior to the data format conversion, the acceleration module manager 330*b* may form first data paths, each of which starts from the buffer memory interface 360*b*, sequentially passes through the processing modules 341-1, 341-3, and 341-4, that is, the computational module 341-1 and the plug-in modules 341-3 and 341-4, and returns to the buffer memory interface 360*b*. As described with reference to FIG. 5, the input path may be a path through which data are input to a storage controller, and the output path may be a path through which the data input through the input path are output from the storage controller. For example, in FIG. 8, DPTH1-1 may indicate the input path, and each of DPTH1-2 and DPTH1-3 may indicate the output path. The acceleration module manager 330*b* may form one of the first data paths based on the DPTH1-1 and the DPTH1-2 and may form the other of the first data paths based on the DPTH1-1 and the DPTH1-3. In this case, first data that are input to the storage controller through the interface channel 361-1 may sequentially pass through the processing module 341-1 being a computational module and the processing module 341-3 being a plug-in module and may then be output as second data through the interface channel 361-2, and the first data may sequentially pass through the processing module 341-1 being a computational module and the processing module 341-4 being a plug-in module and may then be output as second data through the interface channel 361-3.

Figure 9:
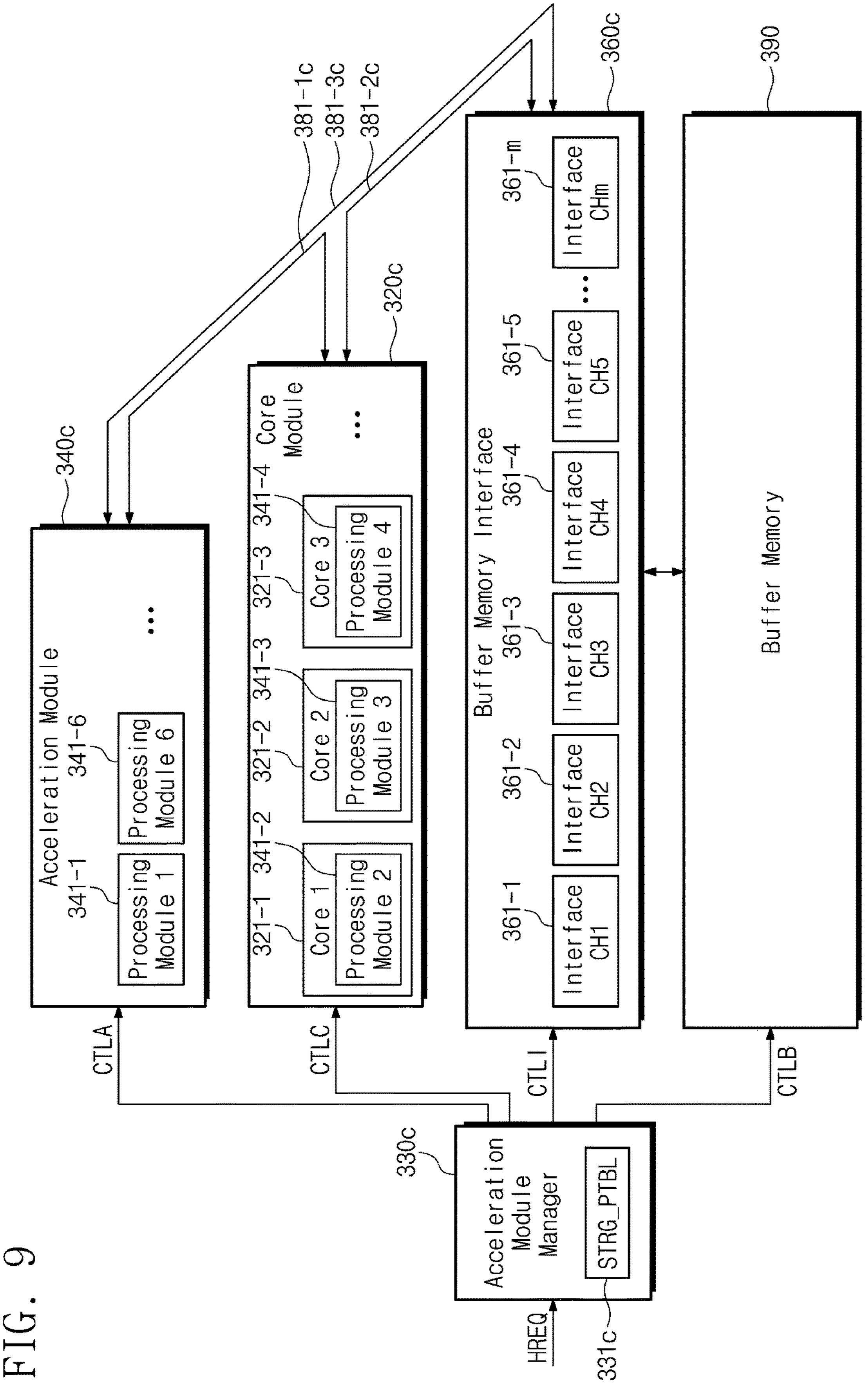
FIG. 9 is a block diagram illustrating an example embodiment of a buffer memory of FIG. 1 and some of components included in a storage controller of FIG. 2.

FIG. 9 is a block diagram illustrating an example embodiment of a buffer memory of FIG. 1 and some of components included in a storage controller of FIG. 2.

Referring to FIGS. 6 and 9, components 330*c*, 331*c*, and 390 of components 330*c*, 331*c*, 340*c*, 320*c*, 360*c*, 381-1*c*, 381-2*c*, 381-3*c*, and 390 illustrated in FIG. 9 may respectively correspond to the components 330*a*, 331*a*, 390 illustrated in FIG. 6 and may perform the same functions as the components 330*a*, 331*a*, 390, and thus, the same description will be omitted to avoid redundancy.

According to an example embodiment, a storage controller may include the acceleration module 340*c*, the core module 320*c* including a plurality of cores 321-1, 321-2, 321-3, etc., and the buffer memory interface 360*c*. The core module 320*c* and the buffer memory interface 360*c* may respectively correspond to the core module 320 and the buffer memory interface 360 described with reference to FIG. 2.

The acceleration module 340*c* may include some of processing modules 341-1, 341-6, etc., and the core module 320*c* may include the others 341-2, 341-3, 341-4, etc. of the processing modules. For example, the acceleration module 340*c* may include one or more computational modules 341-1, 341-6, etc. performing computational processing, and the core module 320*c* may include one or more plug-in modules 341-2, 341-3, 341-4, etc. performing data format conversion.

In an example embodiment, the number of cores 321-1, 321-2, 321-3, etc. may be more than or equal to the number of one or more plug-in modules 341-2, 341-3, 341-4, etc. In this case, the one or more plug-in modules 341-2, 341-3, 341-4, etc. may be respectively provided in one or more of the plurality of cores 321-1, 321-2, 321-3, etc.

In an example embodiment, the acceleration module 340*c* may include a first computational module performing first computational processing, the core module 320*c* may include a first core and a second core, the first core may include a first plug-in module performing first data format conversion, and the second core may include a second plug-in module performing second data format conversion. The first computational module may be one of the one or more computational modules 341-1, 341-6, etc. The first core and the second core may be one of the plurality of cores 321-1, 321-2, 321-3, etc. The first plug-in module may be one of the one or more plug-in modules 341-2, 341-3, 341-4, etc. The second plug-in module may be one of the one or more plug-in modules 341-2, 341-3, 341-4, etc. When a request of a host device is the write request and when the storage processing table 331*c* indicates that data format conversion is performed prior to computational processing, the first plug-in module may perform the first data format conversion on a first data component of the first data, the second plug-in module may perform the second data format conversion on a second data component of the first data, and the first computational module may output second data by performing the first computational processing on output data of the first and second plug-in modules.

In an example embodiment, one of the first data and the second data may have a data format that is suitable for one of the communication with an external electronic device and data processing to be performed in the external electronic device, and the other thereof may have a data format that is suitable for the computational processing to be performed in the storage controller.

In an example embodiment, one of the first data and the second data may be received from the external electronic device, and the other thereof may be output to a nonvolatile memory device.

The buffer memory interface 360*c* may include the interface channels 361-1, 361-2, 361-3, 361-4, 361-5, . . . , 361-*m* (m being a natural number of 6 or more). In an example embodiment, the number of interface channels 361-1 to 361-*m* may be equal to the number of processing modules, and the interface channels 361-1 to 361-*m* may respectively correspond to the processing modules. However, the number of interface channels 361-1 to 361-*m* is provided only as an example. In another embodiment, the number of interface channels 361-1 to 361-*m* may be less than the number of processing modules, depending on a peripheral network environment or a hardware resource of a computational storage device.

In an example embodiment, the buffer memory interface 360*c* may communicate with one or more computational modules 341-1, 341-6, etc. and one or more plug-in modules 341-2, 341-3, 341-4, etc. by using the interface channels 361-1 to 361-*m*.

In an example embodiment, the acceleration module manager 330*c* may form one or more data paths (e.g., 381-1*c*, 381-2*c*, and 381-3*c*), each of which starts from the buffer memory interface 360*c*, passes through all or some of the one or more computational modules 341-1, 341-6, etc. and the one or more plug-in modules 341-2, 341-3, 341-4, etc., and returns to the buffer memory interface 360*c*, such that all or some of the one or more computational modules 341-1, 341-6, etc. and the one or more plug-in modules 341-2, 341-3, 341-4, etc. perform the computational processing and the data format conversion.

In an example embodiment, based on the storage processing table 331*c*, the acceleration module manager 330*c* may enable the one or more computational modules 341-1, 341-6, etc. and the one or more plug-in modules 341-2, 341-3, 341-4, etc. and may enable two or more of the interface channels 361-1 to 361-*m*. In this case, the acceleration module manager 330*c* may enable interface channels as much as a sum of the number of enabled computational modules and the number of enabled plug-in modules and thus may efficiently manage the hardware resource of the buffer memory interface 360*c*.

FIG. 10 is a diagram for describing a storage processing table of FIGS. 1 and 2.

Referring to FIGS. 1, 2, and 10, a storage processing table may include a module ID MID, a processing type, a processing module type, an enable/disable of a processing module, and a state of a processing module. The storage processing table of FIG. 10 is substantially the same as the storage processing table of FIG. 5 except that enabled processing modules are different and a request from a host device is not the read request. As such, additional description regarding same elements will be omitted to avoid redundancy.

For example, a computational storage device according to the disclosure may operate when the processing modules whose module IDs are "6", '7', "8", and "9" are enabled with regard to a specific external electronic device and when the request from the host device is the write request. The processing module whose module ID is "6" may operates as a computational module, and each of processing modules whose module IDs are '7', "8" and "9" may operate as a plug-in module. The processing modules whose module IDs are '7', "8" and "9" may operate on an input path, and the processing module whose module ID is "6" may operate on an output path. In this case, with regard to first data input to a storage controller included in the computational storage device, the processing modules whose module IDs are '7', "8" and "9" may respectively perform "X-axis conversion", "Y-axis conversion", and "X-axis conversion" on 3D data and may output fourth, fifth, and sixth result data to the processing module whose module ID is "6"; the processing module whose module ID is "6" may perform computational processing ("3D Photo conversion") on the fourth to sixth result data and may output seventh result data as second data.

Figure 11:
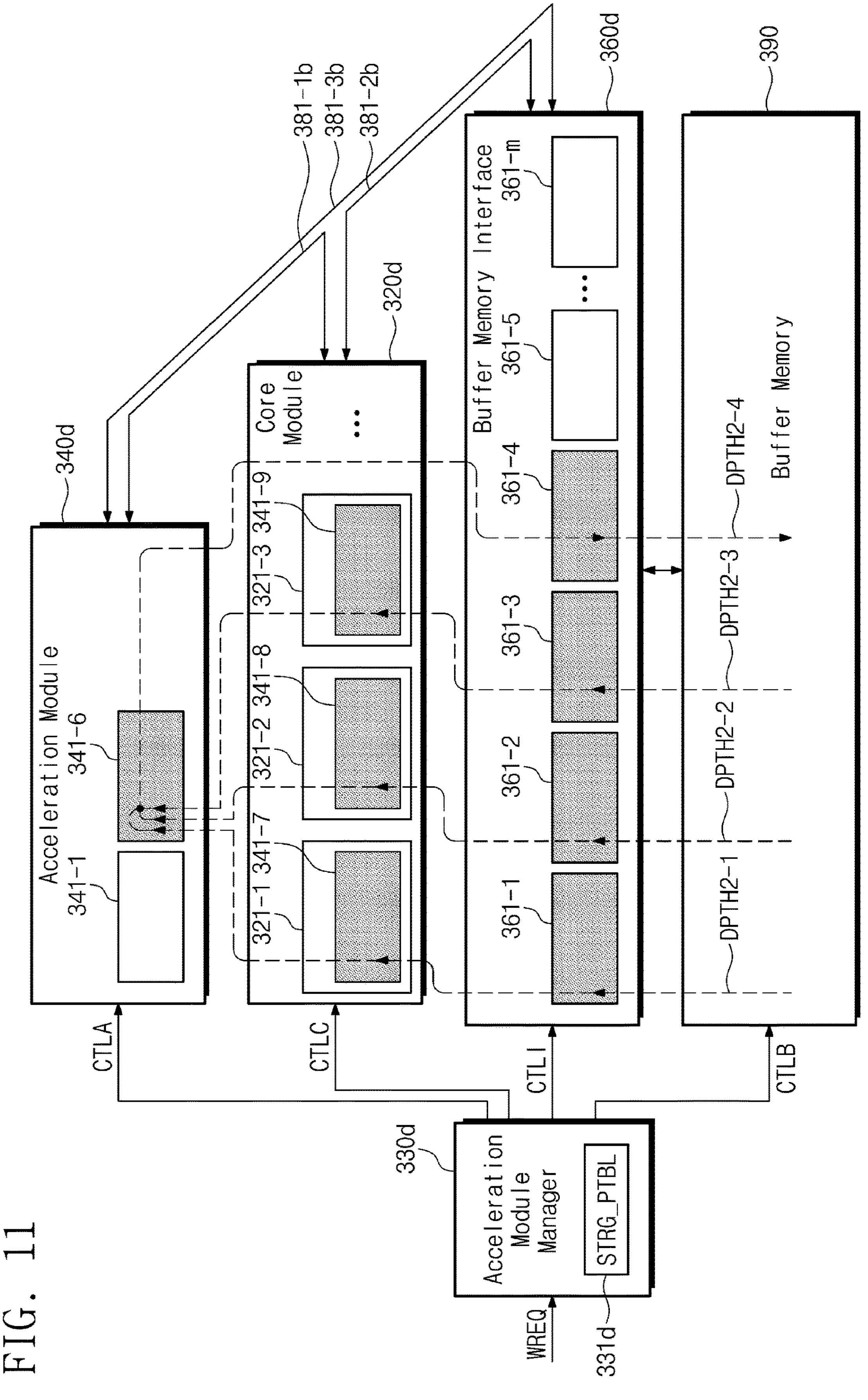
FIG. 11 is a diagram for describing an operation of a buffer memory and some of components included in a storage controller of FIG. 9.

FIG. 11 is a diagram for describing an operation of a buffer memory and some of components included in a storage controller of FIG. 9.

An example where a computational storage device according to the disclosure operates when a request from a host device is a write request WREQ and a storage processing table 331*d* indicates that processing modules whose module IDs are '6', '7', "8", and "9" are enabled is illustrated in FIG. 11.

According to an example embodiment, an acceleration module manager 330*d*, the storage processing table 331*d*, an acceleration module 340*d*, a core module 320*d*, a buffer memory interface 360*d*, and the buffer memory 390 of FIG. 11 may respectively correspond to the acceleration module manager 330*c*, the storage processing table 331*c*, the acceleration module 340*c*, the core module 320*c*, the buffer memory interface 360*c*, and the buffer memory 390 of FIG. 9. The storage processing table 331*d* may correspond to the storage processing table illustrated in FIG. 10.

Referring to FIGS. 9, 10, and 11, the acceleration module 340*d* may include one or more computational modules 341-1, 341-6, etc. performing computational processing, and the core module 320*d* may include one or more plug-in modules 341-7, 341-8, 341-9, etc. performing data format conversion. The buffer memory interface 360*d* may include the interface channels 361-1 to 361-*m*. The processing module whose module ID is "6" may be the computational module 341-6, and the processing modules whose module IDs are "7", "8", and "9" may be the plug-in modules 341-7, 341-8, and 341-9.

When the request from the host device is the write request WREQ and when the storage processing table 331*d* indicates that the data format conversion is performed prior to the computational processing, the acceleration module manager 330*d* may form second data paths, each of which starts from the buffer memory interface 360*d*, sequentially passes through the corresponding one of the plug-in modules 341-7, 341-8, and 341-9 and the computational module 341-6, and returns to the buffer memory interface 360*d*. As described with reference to FIG. 5, the input path may be a path through which data are input to a storage controller, and the output path may be a path through which the data input through the input path are output from the storage controller. For example, in FIG. 11, each of DPTH2-1, DPTH2-2, and DPTH2-3 may indicate the input path, and DPTH2-4 may indicate the output path. The acceleration module manager 330*d* may form one of the second data paths based on the DPTH2-1 and the DPTH2-4, may form another of the second data paths based on the DPTH2-2 and the DPTH2-4, and may form the other of the second data paths based on the DPTH2-3 and the DPTH2-4. In this case, first data input to the storage controller through the interface channel 361-1 may sequentially pass through the processing module 341-7 being a plug-in module and the processing module 341-6 being a computational module and may then be output as second data through the interface channel 361-4. First data input to the storage controller through the interface channel 361-2 may sequentially pass through the processing module 341-8 being a plug-in module and the processing module 341-6 being a computational module and may then be output as second data through the interface channel 361-4. First data input to the storage controller through the interface channel 361-3 may sequentially pass through the processing module 341-9 being a plug-in module and the processing module 341-6 being a computational module and may then be output as second data through the interface channel 361-4.

Figure 12:
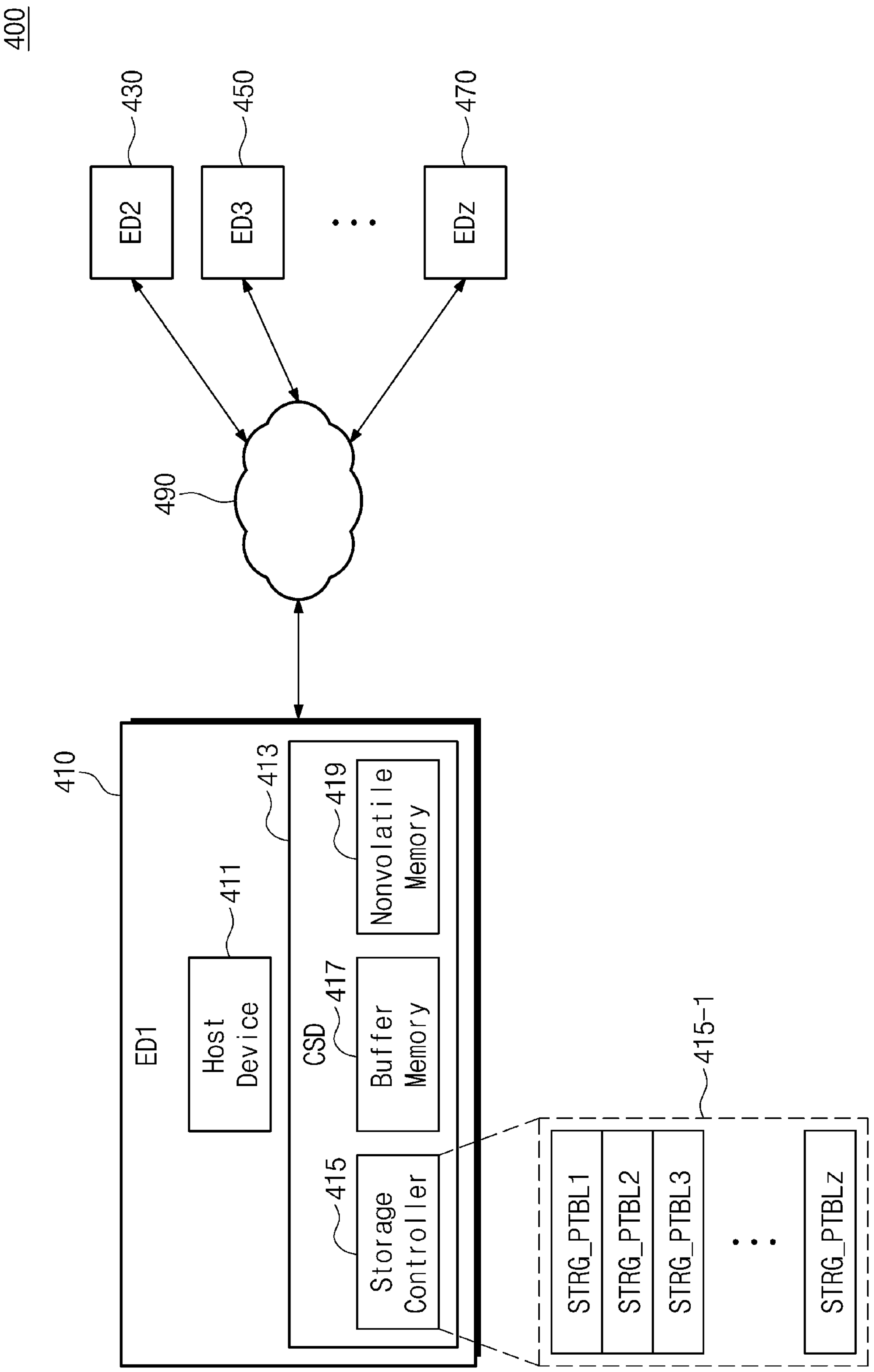
FIG. 12 is a block diagram illustrating an electronic system according to an example embodiment of the disclosure.

FIG. 12 is a block diagram illustrating an electronic system according to an example embodiment of the disclosure.

Referring to FIG. 12, an electronic system 400 includes a first electronic device (ED1) 410, a second electronic device (ED2) 430, a third electronic device (ED3) 450, and a z-th electronic device (EDz) 470 (z being a natural number of 4 or more).

The first electronic device 410 may include a host device 411 and a computational storage device 413, and the computational storage device 413 may include a storage controller 415, a buffer memory 417, and a nonvolatile memory 419. The storage controller 415 may include storage processing tables 415-1.

The first electronic device 410 may correspond to the first electronic device 10 of FIG. 1. For example, the components 411, 413, 415, 417, and 419 of the first electronic device 410 may respectively correspond to the host device 200, the computation storage device 100, the storage controller 110, the buffer memory 190, and the NVM 150 illustrated in FIG. 1, and the storage processing tables 415-1 may correspond to the storage processing table STRG_PTBL illustrated in FIG. 1.

In an example embodiment, the storage controller 415 may output second data by performing computational processing and data format conversion on first data input to the storage controller 415 based on a first storage processing table (e.g., STRG_PTBL1) associated with the host device 411, a second storage processing table (e.g., STRG_PTBL2) associated with the second electronic device 430, a third storage processing table (e.g., STRG_PTBL3) associated with the third electronic device 450, and a z-th storage processing table (e.g., STRG_PTBLz) associated with the z-th electronic device 470.

The first electronic device 410 may communicate with the second to z-th electronic devices 430, 450, and 470 over a network 490, and the network 490 may correspond to the network 15 illustrated in FIG. 1.

In an example embodiment, one of the first data and the second data may have a data format that is suitable for one of the communication with the second electronic device 430, the third electronic device 450, and the z-th electronic device 470 and data processing to be performed in the host device 411, and the other thereof may have a data format that is suitable for computational processing to be performed in the storage controller 415.

In an example embodiment, one of the first data and the second data may be received from one of the second electronic device 430, the third electronic device 450, the z-th electronic device 470, and the host device 411, and the other thereof may be output to the nonvolatile memory 419. However, the disclosure is not limited thereto. In an example embodiment, one of the first data and the second data may be received from the nonvolatile memory 419, and the other thereof may be output to one of the second electronic device 430, the third electronic device 450, the z-th electronic device 470, and the host device 411.

In an example embodiment, when the second data are sent to one of the second electronic device 430, the third electronic device 450, the z-th electronic device 470, and the host device 411 and the second electronic device 430, the third electronic device 450, the z-th electronic device 470, and the host device 411 receive the second data, data processing may be performed without additional data format conversion.

In an example embodiment, the buffer memory 417 may include a first storage region associated with the host device 411, and may include a second storage region associated with the second electronic device 430, the third electronic device 450, and the z-th electronic device 470. The first data or the second data may be written in the first storage region based on the first storage processing table or may be read from the first storage region based on the first storage processing table. The first data or the second data may be written in the second storage region based on the second to z-th storage processing tables or may be read from the second storage region based on the second to z-th storage processing tables.

Figure 13:
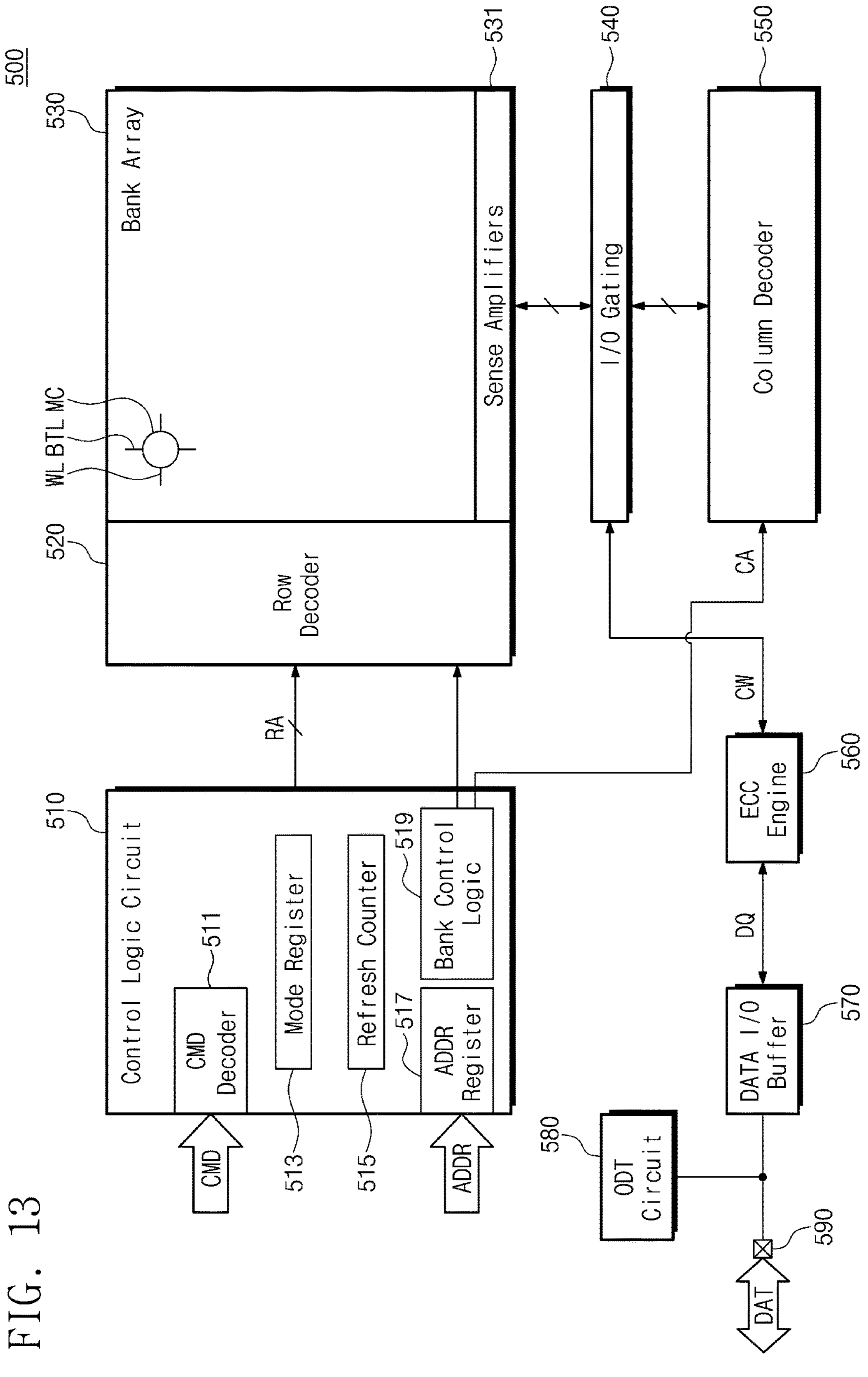
FIG. 13 is a block diagram illustrating an example of a memory device included in a buffer memory of FIG. 12.

FIG. 13 is a block diagram illustrating an example of a memory device included in a buffer memory of FIG. 12.

Referring to FIGS. 12, and 13, a memory device 500 may include a control logic circuit 510, a row decoder 520, a bank array 530, one or more sense amplifiers 531, an input/output (I/O) gating circuit 540, a column decoder 550, an ECC engine 560, a data input/output buffer 570, and an on-die termination (ODT) circuit 580. The control logic circuit 510 may include a command decoder 511, a mode register 513, a refresh counter 515, an address register 517, and bank control logic 519. For example, the memory device 500 may be a volatile memory device. In detail, the memory device 500 may be a DRAM.

The bank array 530 may include a plurality of bank arrays. The row decoder 520 may include a plurality of bank row decoders respectively connected with the plurality of bank arrays, the column decoder 550 may include a plurality of bank column decoders respectively connected with the plurality of bank arrays, and the one or more sense amplifiers 531 may include a plurality of bank sense amplifiers respectively connected with the plurality of bank arrays. The plurality of bank arrays, the plurality of bank row decoders, the plurality of bank column decoders, and the plurality of bank sense amplifiers may constitute a plurality of banks. Each of the plurality of bank arrays may include a plurality of memory cells MC that are formed at intersections of a plurality of word lines WL and a plurality of bit lines BL.

The address register 517 may receive the address ADDR including a bank address, a row address, and a column address from the memory controller. The address register 517 may provide the bank address to the bank control logic 519, may provide the row address to the row decoder 520, and may provide the column address to the column decoder 550.

The bank control logic 519 may generate a bank control signal in response to the bank address. A bank row decoder and a bank column decoder that correspond to the bank address may be activated based on the bank control signal.

The refresh counter 515 may generate a refresh row address that sequentially increases or decreases under control of the control logic circuit 510. The bank column decoders activated from the plurality of bank column decoders may activate sense amplifiers, which correspond to the bank address, the row address, and the column address and are included in the one or more sense amplifiers 531, by using the input/output gating circuit 540.

A codeword CW read from one of the plurality of bank arrays may be sensed by sense amplifiers corresponding to the one bank array, the ECC engine 560 may perform ECC decoding on the sensed codeword CW, and a DQ signal may be provided to the memory controller through the data input/output buffer 570 as an ECC decoding result. The data DAT that are transferred from an input/output pad 590 to the data input/output buffer 570 or are transferred from the data input/output buffer 570 to the input/output pad 590 may include the first data DAT1 and the second data DAT2 described with reference to FIG. 1. The data input/output buffer 570 may include reception drivers for encoding the data DTA and may receive reference voltages for the encoding.

The data DAT to be written in one of the plurality of bank arrays may be provided to the ECC engine 560, the ECC engine 560 may generate parity bits based on the data DAT and may provide a codeword including the data DAT and the parity bits to the input/output gating circuit 540, and the input/output gating circuit 540 may write the codeword in the one bank array.

The control logic circuit 510 may control the operation of the memory device 500. For example, the control logic circuit 510 may generate control signals such that the memory device 500 performs a write operation or a read operation. The control logic circuit 510 may include the command decoder 511 that decodes the command CMD received from the memory controller and the mode register 513 for setting an operation mode of the memory device 500. For example, the command decoder 511 may decode a write enable signal, a row address strobe signal, a column address strobe signal, a chip select signal, etc. and may generate the control signals corresponding to the command CMD.

The ODT circuit 580 may be connected with the data input/output pad 590 and the data input/output buffer 570 and may perform impedance matching.

Figure 15:
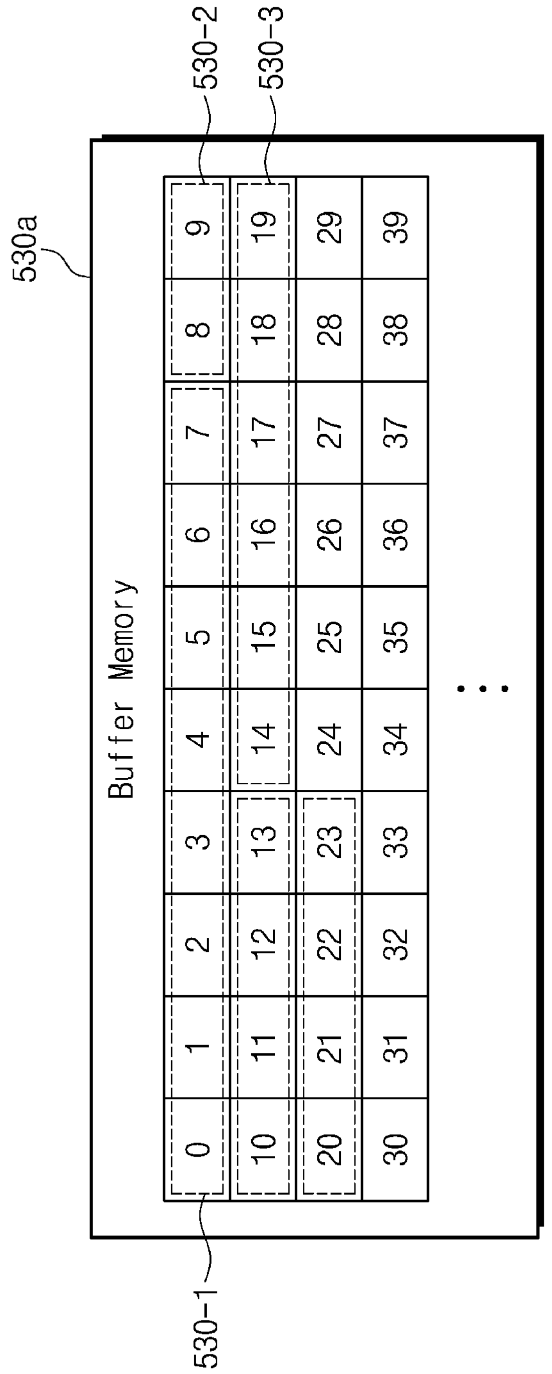

FIGS. 14 and 15 are diagrams for describing a process where data are written in a buffer memory of FIG. 12 or a process where data are read from the buffer memory.

An external electronic device access table is illustrated in FIG. 14.

Referring to FIG. 14, the external electronic device access table may include an access order, an electronic device ID, a CPTM ID, an LBA, and a data size, and one or more of rows of the external electronic device access table may be cumulatively formed whenever various electronic devices accessing a storage controller (e.g., 110 of FIG. 1 or 415 of FIG. 12) of a computational storage device (e.g., 100 of FIG. 1 or 413 of FIG. 12) from the outside accesses the computational storage device. For example, after an electronic device having an ID #1 accesses the computational storage device, an electronic device having ID #2 and the electronic device having ID #1 may sequentially access the computational storage device. In this case, the external electronic device access table may be formed as illustrated in FIG. 14.

The CPTM ID may include an ID of a processing module that corresponds to each of electronic devices accessing the computational storage device and is associated with computational processing performed in the computational storage device. For example, a processing module ID written in the CPTM ID may be an ID of a computational module among processing modules (e.g., 341-1, 341-2, 341-3, 341-4, 341-5, . . . , 341-*m* of FIG. 3), but the disclosure is not limited thereto. The external electronic device access table may further include a PLGM ID, and the PLGM ID may include an ID of a processing module that corresponds to each of electronic devices accessing the computational storage device and is associated with data format conversion performed in the computational storage device.

The LBA may include a logical data address that corresponds to an access of the electronic devices to the computational storage device and is provided from a host device, and the data size may include a size of data that corresponds to an access of the electronic devices and are provided from the host device.

Referring to FIGS. 14 and 15, a buffer memory 530*a* may include a first storage region 530-1, a second storage region 530-2, and a third storage region 530-3. For example, the first storage region 530-1 and the third storage region 530-3 may be associated with the host device (e.g., 411 of FIG. 12), and the second storage region 530-2 may be associated with one of a second electronic device to a z-th electronic device (e.g., 430, 450, . . . , 470 of FIG. 12).

In an example embodiment, first data that are input from the host device to the storage controller may be written in the first storage region 530-1 or may be read from the first storage region 530-1; second data that are output from the storage controller to the host device may be written in the third storage region 530-3 or may be read from the third storage region 530-3.

In an example embodiment, first data that are input to the storage controller from one of the second electronic device to the z-th electronic device (e.g., 430, 450, . . . , 470 of FIG. 12) and second data that are output from the storage controller to one of the second electronic device to the z-th electronic device (e.g., 430, 450, . . . , 470 of FIG. 12) may be written in the second storage region 530-2 or may be read from the second storage region 530-2.

Figure 16:
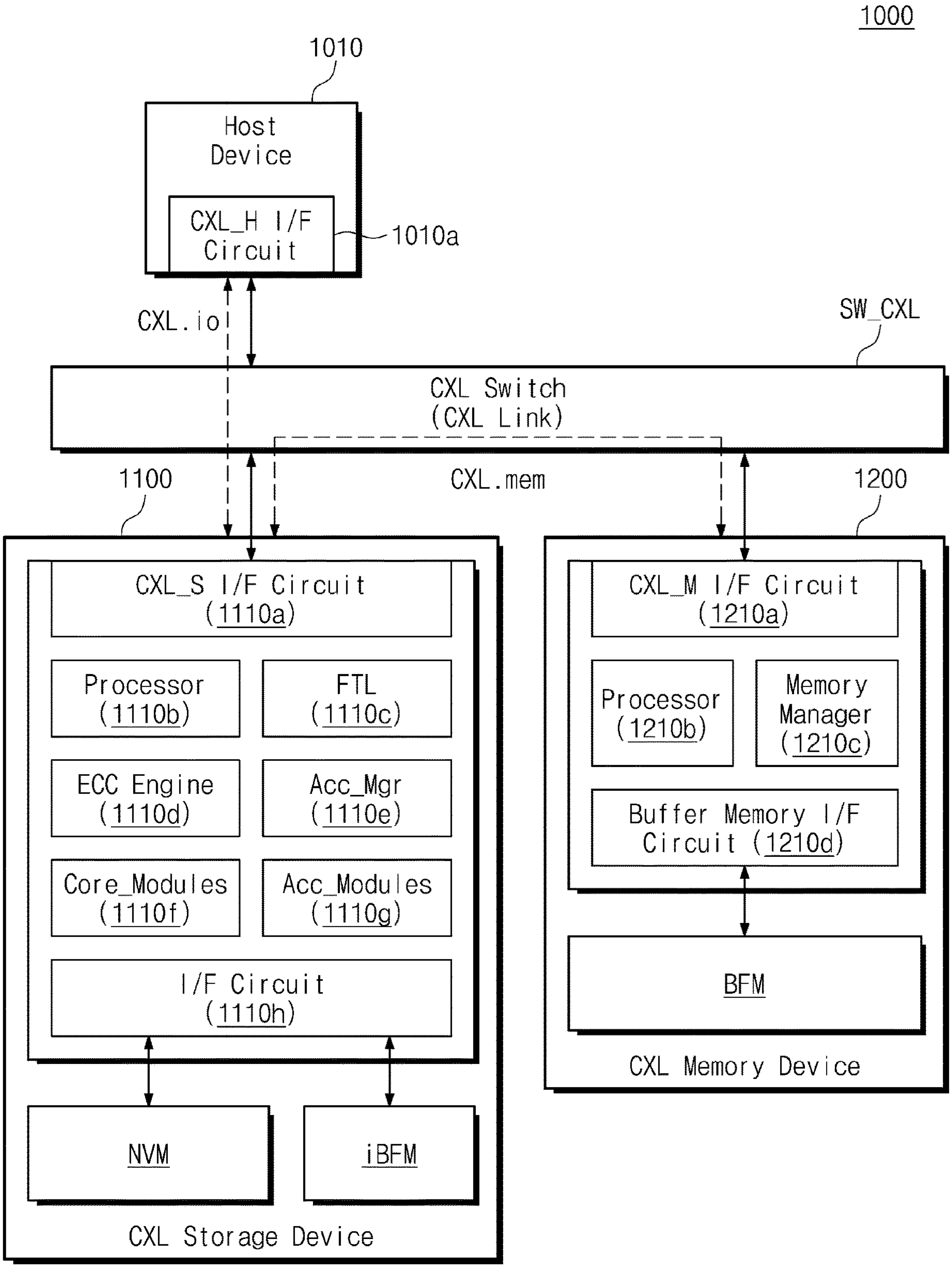
FIG. 16 is a block diagram illustrating a computational storage system according to an example embodiment of the disclosure.

FIG. 16 is a block diagram illustrating a computational storage system according to an example embodiment of the disclosure.

Referring to FIG. 16, a computational storage system 1000 includes a host device 1010, a compute express link (CXL) storage device 1100, and a CXL memory device 1200 that communicate through a CXL switch SW_CXL.

The CXL switch SW_CXL may be a component included in a CXL interface. For example, the CXL interface may perform functions of a host interface, a buffer memory interface, and a nonvolatile memory interface (e.g., 350, 360, and 370 of FIG. 2).

The host device 1010 may include a CXL host interface (I/F) circuit 1010*a*. The CXL host interface circuit 1010*a* may communicate with the CXL storage device 1100 or the CXL memory device 1200 through the CXL switch SW_CXL.

The CXL storage device 1100 may include a CXL storage interface circuit 1110*a*, a processor 1110*b*, a flash translation layer (FTL) 1110*c*, an ECC engine 1110*d*, an acceleration module manager (Acc_Mgr) 1110*e*, a core module 1110*f*, an acceleration module (Acc_Modules) 1110*g*, a nonvolatile memory interface circuit 1110*h*, a nonvolatile memory NVM, and an internal buffer memory iBFM.

The components 1110*a*, 1110*b*, 1110*c*, 1110*d*, 1110*e*, 1110*f*, 1110*g*, and 1110*h* included in the CXL storage device 1100 may constitute a "CXL storage controller", and some components 1110*a*, 1110*b*, 1110*e*, 1110*f*, 1110*g*, and 1110*h* among the components 1110*a* to 1110*h* included in the CXL storage controller may respectively correspond to the components 350, 310, 330, 320, 340, and 370 described with reference to FIG. 2.

In an example embodiment, the CXL storage device 1100 may perform computational processing and data format conversion on first data input to the CXL storage controller based on a storage processing table associated with the host device 1010 and may output second data.

In an example embodiment, under control of the host device 1010, the CXL storage controller may store data in the nonvolatile memory NVM or may send data present in the nonvolatile memory NVM to the host device 1010. For example, the nonvolatile memory NVM may be a NAND flash memory, but the disclosure is not limited thereto.

In an example embodiment, the internal buffer memory iBFM may temporarily store data that are input to the CXL storage controller or are output from the CXL storage controller.

The CXL memory device 1200 may include a CXL memory interface circuit 1210*a*, a processor 1210*b*, a memory manager 1210*c*, a buffer memory interface circuit 1210*d*, and a buffer memory BFM. The components 1210*a*, 1210*b*, 1210*c*, and 1210*d* included in the CXL memory device 1200 may constitute a "CXL memory controller".

In an example embodiment, under control of the host device 1010, the CXL memory device 1200 may store data in the buffer memory BFM or may send data stored in the buffer memory BFM to the host device 1010. For example, the buffer memory BFM may be a DRAM, but the disclosure is not limited thereto.

In an example embodiment, the host device 1010, the CXL storage device 1100, and the CXL memory device 1200 may be configured to share the same interface. For example, the host device 1010, the CXL storage device 1100, and the CXL memory device 1200 may communicate with each other through the CXL switch SW_CXL. The CXL switch SW_CXL may refer to a low-latency and high-bandwidth link that supports coherency, memory access, and dynamic protocol muxing of IO protocols such that various connections between accelerators, memory devices, or various electronic devices are possible.

In an example embodiment, the internal buffer memory iBFM, the buffer memory BFM, or the CXL memory device 1200 may correspond to the buffer memory 190 described with reference to FIG. 1.

As described above, according to an example embodiment of the disclosure, a computational storage device, a computational storage system including the computational storage device, and an electronic system including the computational storage system may perform data processing to be performed in an external electronic device and data format conversion for communication with the external electronic device, based on a storage processing table including data processing information and data format information.

Even in the case where an external data format being a data format of data moving from the outside of the computational storage device and an internal data format being a data format of data moving inside the computational storage device do not coincide with each other, the computational storage device may convert the external data format into the internal data format or the internal data format into the external data format such that a firmware program (or a computational storage program) is used without modification (or without the replacement or version update of the firmware program). That is, the reusability of the firmware program may be improved.

The computational storage device may efficiently manage a hardware resource of each of an acceleration module and a buffer memory interface by selectively enabling interface channels included in the acceleration module and interface channels included in the buffer memory interface based on the storage processing table.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A computational storage device of a first electronic device, the computational storage device comprising:

a nonvolatile memory;

a buffer memory; and a storage controller comprising a plurality of processing modules and configured to:

communicate with the nonvolatile memory and the buffer memory, perform, based on first information in a storage processing table associated with a second electronic device external to the first electronic device, at least one of a computational processing and a data format conversion on first data input to the storage controller to output second data; and send the second data to the second electronic device through an interface of the first electronic device, wherein the storage processing table indicates one or more processing modules, among the plurality of processing modules, that are enabled independently for each of a plurality of external electronic devices that are external to the computational storage device, the second electronic device being one of the plurality of external electronic devices, wherein the plurality of processing modules comprise:

a first computational module configured to perform a first computational processing, a second computational module configured to perform a second computational processing, a first plug-in module configured to perform a first data format conversion, and a second plug-in module configured to perform a second data format conversion, and wherein, based on a request from a host device to perform an operation related to the second electronic device on the first data, obtaining the first information associated with the second electronic device from the storage processing table, the first information indicating that at least one of the second computational processing or second data format conversion is to be performed on the first data, and wherein the storage controller is further configured to obtain the second data based on the second computational module performing the second computational processing on the first data or the second plug-in module configured to perform the second data format conversion on the first data.

2. The computational storage device of claim 1, wherein the first information comprises:

data processing information corresponding to data processing to be performed in the second electronic device, and data format information corresponding to a scheme to communicate with the second electronic device.

3. The computational storage device of claim 2, wherein the storage controller comprises an acceleration module, and wherein the acceleration module comprises:

a plurality of computational modules configured to perform the computational processing based on the data processing information, the plurality of computational modules including the first computational module and the second computational module; and a plurality of plug-in modules configured to perform the data format conversion based on the data format information, the plurality of plug-in modules including the first plug-in module and the second plug-in module.

4. The computational storage device of claim 3, wherein the storage processing table indicates an order of performing the computational processing and the data format conversion based on a type of a request from a host device.

5. The computational storage device of claim 4, wherein, based on the request from the host device being a read request and based on the storage processing table indicating that the computational processing is performed prior to the data format conversion, the second computational module is configured to perform the computational processing on the first data, and the second plug-in module is configured to output the second data by performing the data format conversion on the first data on which the computational processing has been performed by the second computational module.

6. The computational storage device of claim 4, wherein, based on the request from the host device being a write request and based on the storage processing table indicating that the data format conversion is performed prior to the computational processing, the second plug-in module is configured to perform the data format conversion on the first data, and the second computational module is configured to output the second data by performing the computational processing on the first data on which the data format conversion has been performed by the second plug-in module.

7. The computational storage device of claim 4, wherein the storage controller further comprises:

a buffer memory interface comprising two or more interface channels, the buffer memory interface being configured to communicate with the plurality of computational modules, the plurality of plug-in modules, and the buffer memory through the two or more interface channels; and an acceleration module manager configured to control the plurality of computational modules, the plurality of plug-in modules, and the buffer memory interface based on the request from the host device and the storage processing table.

8. The computational storage device of claim 7, wherein, based on the storage processing table indicating that the computational processing is performed prior to the data format conversion, the acceleration module manager is configured to form one or more data paths, wherein each of the one or more data paths starts from the buffer memory interface, sequentially passes through the plurality of computational modules and the plurality of plug-in modules, and returns to the buffer memory interface.

9. The computational storage device of claim 8, wherein the acceleration module manager is configured to enable the plurality of computational modules, the plurality of plug-in modules, and the two or more interface channels based on the storage processing table, and wherein a number of the enabled interface channels is equal to a sum of a number of the enabled computational modules and the number of the enabled plug-in modules.

10. The computational storage device of claim 2, wherein the storage controller further comprises:

an acceleration module comprising a plurality of computational modules performing the computational processing, the plurality of computational modules including the first computational module and the second computational module, and a core module comprising a plurality of cores, wherein the core module further comprises a plurality of plug-in modules performing the data format conversion, the plurality of plug-in modules including the first plug-in module and the second plug-in module.

11. The computational storage device of claim 10, wherein a number of the plurality of cores is more than or equal to a number of the plurality of plug-in modules, and wherein the plurality of plug-in modules are respectively provided in one or more of the plurality of cores.

12. The computational storage device of claim 11, wherein a first core, among the plurality of cores, comprises the first plug-in module, among the plurality of plug-in modules, the first core being configured to perform the first data format conversion, wherein a second core, among the plurality of cores, comprises the second a plug-in module, among the plurality of plug-in modules, the second core being configured to perform the second data format conversion, and wherein, based on a request from the host device being a write request and based on the storage processing table indicating that the data format conversion is performed prior to the computational processing, the first plug-in module is configured to perform the first data format conversion on a first data component of the first data, the second plug-in module is configured to perform the second data format conversion on a second data component of the first data, and the first computational module is configured to output the second data by performing a first computational processing on first output data of the first plug-in module and second output data of the second plug-in module.

13. The computational storage device of claim 1, wherein one of the first data and the second data has a data format suitable for one of communication with the second electronic device and a data processing to be performed in the second electronic device, and the other of the first data and the second data has a data format suitable for the computational processing to be performed in the storage controller.

14. An electronic system comprising:

a first electronic device; and a second electronic device configured to communicate with the first electronic device, wherein the first electronic device comprises a host device and a computational storage device, wherein the computational storage device of the first electronic device comprises:

a nonvolatile memory;

a buffer memory; and a storage controller comprising a plurality of processing modules and configured to:

communicate with the nonvolatile memory and the buffer memory, and perform, based on first information in a first storage processing table associated with the host device and a second storage processing table associated with the second electronic device external to the first electronic device, at least one of a computational processing and a data format conversion on first data input to the storage controller to output second data; and send the second data to the second electronic device through an interface of the first electronic device, wherein the second storage processing table indicates one or more processing modules, among the plurality of processing modules, that are enabled independently for each of a plurality of external electronic devices that are external to the computational storage device, the second electronic device being one of the plurality of external electronic devices, wherein the plurality of processing modules comprise:

a first computational module configured to perform a first computational processing, a second computational module configured to perform a second computational processing, a first plug-in module configured to perform a first data format conversion, and a second plug-in module configured to perform a second data format conversion, and wherein, based on a request from a host device to perform an operation related to the second electronic device on the first data, obtaining the first information associated with the second electronic device from the second storage processing table, the first information indicating that at least one of the second computational processing or second data format conversion is to be performed on the first data, and wherein the storage controller is further configured to obtain the second data based on the second computational module performing the second computational processing on the first data or the second plug-in module configured to perform the second data format conversion on the first data.

15. The electronic system of claim 14, wherein one of the first data and the second data has a data format suitable for one of communication with the second electronic device and a data processing to be performed in the host device, and the other of the first data and the second data has a data format suitable for the computational processing to be performed in the storage controller.

16. The electronic system of claim 14, wherein one of the first data and the second data is received from one of the second electronic device and the host device, and the other of the first data and the second data is output to the nonvolatile memory.

17. The electronic system of claim 14, wherein the buffer memory comprises a first storage region associated with the host device and a second storage region associated with the second electronic device, wherein the first data or the second data are written in the first storage region based on the first storage processing table or are read from the first storage region based on the first storage processing table, and wherein the first data or the second data are written in the second storage region based on the second storage processing table or are read from the second storage region based on the second storage processing table.

18. A first electronic device comprising:

a host device;

a compute express link (CXL) switch;

a CXL memory device; and a CXL storage device comprising a CXL storage controller, the CXL storage controller comprising a plurality of processing modules and configured to:

communicate with the host device and the CXL memory device through the CXL switch, and perform, based on information in a storage processing table associated with a second electronic device external to the first electronic device, computational processing and data format conversion on first data input to the CXL storage controller to output second data; and send the second data to the second electronic device through an interface of the first electronic device, wherein the storage processing table indicates one or more processing modules, among the plurality of processing modules, that are enabled independently for each of a plurality of external electronic devices that are external to the CXL storage device, the second electronic device being one of the plurality of external electronic devices, wherein the plurality of processing modules comprises:

a first computational module configured to perform a first computational processing, a second computational module configured to perform a second computational processing, a first plug-in module configured to perform a first data format conversion, and a second plug-in module configured to perform a second data format conversion, and wherein, based on a request from a host device to perform an operation related to the second electronic device on the first data, obtaining the information associated with the second electronic device from the storage processing table, the information indicating that at least one of the second computational processing or second data format conversion is to be performed on the first data, and wherein the CXL storage controller is further configured to obtain the second data based on the second computational module performing the second computational processing on the first data or the second plug-in module configured to perform the second data format conversion on the first data.

19. The computational storage device of claim 1, wherein storage controller is further configured to receive the storage processing table from the host device of the first electronic device including the computational storage device.

* * * * *